United States Patent
Katukam et al.

(10) Patent No.: US 11,258,678 B1
(45) Date of Patent: Feb. 22, 2022

(54) METHODS AND SYSTEMS FOR SERVICE-LEVEL AGREEMENT (SLA) NETWORK CAPACITY MANAGEMENT

(71) Applicant: Nile Global, Inc., Cupertino, CA (US)

(72) Inventors: Suresh Katukam, Milpitas, CA (US); Gopal Raman, San Jose, CA (US); Promode Nedungadi, San Jose, CA (US); Sathish Damodaran, San Jose, CA (US); Sudharsan Rangarajan, Fremont, CA (US); Shiv Mehra, Saratoga, CA (US); Ganesh Sundaram, Santa Clara, CA (US)

(73) Assignee: Nile Global, Inc., San Jose, CA (US)

( * ) Notice: Subject to any disclaimer, the term of this patent is extended or adjusted under 35 U.S.C. 154(b) by 0 days.

(21) Appl. No.: 17/338,563

(22) Filed: Jun. 3, 2021

(51) Int. Cl.
  *G06F 15/173* (2006.01)
  *H04L 41/50* (2022.01)
  *H04L 67/10* (2022.01)
  *H04L 41/5009* (2022.01)
  *H04W 88/08* (2009.01)

(52) U.S. Cl.
  CPC ...... *H04L 41/5032* (2013.01); *H04L 41/5009* (2013.01); *H04L 67/10* (2013.01); *H04W 88/08* (2013.01)

(58) Field of Classification Search
  None
  See application file for complete search history.

(56) References Cited

U.S. PATENT DOCUMENTS

| | | | |
|---|---|---|---|
| 9,444,696 B2 | 9/2016 | Allen et al. | |
| 10,499,273 B1 * | 12/2019 | Walsh | H04B 7/18508 |
| 10,572,650 B2 | 2/2020 | Cooper et al. | |
| 10,725,886 B2 * | 7/2020 | Savolainen | G06F 11/3452 |
| 2002/0152305 A1 * | 10/2002 | Jackson | H04L 41/509 709/224 |
| 2007/0110098 A1 * | 5/2007 | Hart | H04L 47/13 370/464 |
| 2015/0195149 A1 | 7/2015 | Vasseur et al. | |
| 2018/0123963 A1 | 5/2018 | Thubert et al. | |
| 2018/0242178 A1 | 8/2018 | Barton et al. | |
| 2020/0007410 A1 * | 1/2020 | Walsh | H04W 4/44 |
| 2020/0012748 A1 | 1/2020 | Ganesan et al. | |
| 2021/0028991 A1 | 1/2021 | Nataraj | |
| 2021/0067419 A1 | 3/2021 | Adam et al. | |

OTHER PUBLICATIONS

Non-Final Office Action, U.S. Appl. No. 17/338,517 dated Dec. 2, 2021, 18 pgs.
Gaillard, G. et al. "Service Level Agreements for Wireless Sensor Networks: A WSN operator's point of view," 2014 IEEE Network Operations and Management Symposium (NOMS), (2014), 8 pgs.
Iordache, George Valentin et al. "Service Level Agreement Characteristics of Monitoring Wireless Sensor Networks for Water Resource Management ( SLAs 4 Water )." (2017), 8 pgs.

* cited by examiner

*Primary Examiner* — Quang N Nguyen
(74) *Attorney, Agent, or Firm* — Loza & Loza, LLP

(57) ABSTRACT

Embodiments of a device and method are disclosed. In an embodiment, a method for network capacity management of a network deployed at a customer site involves at a cloud server connected to the network, receiving network capacity information of the network deployed at the customer site from wireless sensors deployed at the customer site and at the cloud server, automatically determining a service-level agreement (SLA) network capacity metric based on the network capacity information.

16 Claims, 19 Drawing Sheets

FIG. 6

METHODS AND SYSTEMS FOR SERVICE-LEVEL AGREEMENT (SLA) NETWORK CAPACITY MANAGEMENT

BACKGROUND

Network management, for example, network availability management, network capacity management, and/or network coverage management plays an important role in ensuring that network designs and deployments meet agreed upon commitments. Typically, a service-level agreement (SLA) defines as a commitment between a service provider and a client. However, for a network with wireless capabilities (e.g., wireless local area network (WLAN) capabilities), it can be difficult to implement an SLA-based network management due to varying channel conditions and/or interference. Therefore, there is a need for technology that can provide an SLA-based network management for a network with wireless capabilities.

SUMMARY

Embodiments of a device and method are disclosed. In an embodiment, a method of network capacity management of a network deployed at a customer site involves at a cloud server connected to the network, receiving network capacity information of the network deployed at the customer site from wireless sensors deployed at the customer site and at the cloud server, automatically determining an SLA network capacity metric based on the network capacity information. Other embodiments are also described.

In an embodiment, the method further includes at the cloud server, generating an alert regarding the network deployed at the customer site when the SLA network capacity metric does not satisfy a predetermined threshold.

In an embodiment, the SLA network capacity metric includes a percentage of time in which a predetermined network capacity is satisfied in a time unit, and at the cloud server, generating the alert regarding the network deployed at the customer site when the SLA network capacity metric does not satisfy the predetermined threshold includes at the cloud server, generating the alert regarding the network deployed at the customer site when the percentage of time in which the predetermined network capacity is satisfied in the time unit is lower than the predetermined threshold.

In an embodiment, the network capacity information includes information regarding wireless access points (APs) in the network deployed at the customer site whose beacon signals are received by the wireless sensors deployed at the customer site.

In an embodiment, the information regarding the wireless APs in the network deployed at the customer site whose beacon signals are received by the wireless sensors deployed at the customer site includes beacon AP reports from the wireless sensors.

In an embodiment, each of the beacon AP reports contains at least one wireless AP in the network deployed at the customer site whose beacon signal is received by a respective wireless sensor of the wireless sensors deployed at the customer site.

In an embodiment, the network capacity information includes a quantity of wireless APs in the network deployed at the customer site whose beacon signals are received by the wireless sensors deployed at the customer site.

In an embodiment, at the cloud server, automatically determining the SLA network capacity metric based on the network capacity information includes at the cloud server, automatically determining the SLA network capacity metric based on the network capacity information for each floor at the customer site.

In an embodiment, at the cloud server, automatically determining the SLA network capacity metric based on the network capacity information includes at the cloud server, automatically determining the SLA network capacity metric based on the network capacity information for each building at the customer site.

In an embodiment, the method further involves at the cloud server, receiving network availability or coverage information of the network deployed at the customer site and at the cloud server, automatically determining an SLA network availability or coverage metric based on the network availability or coverage information.

In an embodiment, a cloud server for network capacity management of a network deployed at a customer site includes memory and one or more processors configured to receive network capacity information of the network deployed at the customer site from a plurality of wireless sensors deployed at the customer site and automatically determine an SLA network capacity metric based on the network capacity information.

In an embodiment, the one or more processors are further configured to generate an alert regarding the network deployed at the customer site when the SLA network capacity metric does not satisfy a predetermined threshold.

In an embodiment, the SLA network capacity metric includes a percentage of time in which a predetermined network capacity is satisfied in a time unit, and the one or more processors are further configured to generate the alert regarding the network deployed at the customer site when the percentage of time in which the predetermined network capacity is satisfied in the time unit is lower than the predetermined threshold.

In an embodiment, the network capacity information includes information regarding wireless APs in the network deployed at the customer site whose beacon signals are received by the wireless sensors deployed at the customer site.

In an embodiment, the information regarding the wireless APs in the network deployed at the customer site whose beacon signals are received by the wireless sensors deployed at the customer site includes beacon AP reports from the wireless sensors.

In an embodiment, each of the beacon AP reports contains at least one wireless AP in the network deployed at the customer site whose beacon signal is received by a respective wireless sensor of the wireless sensors deployed at the customer site.

In an embodiment, the network capacity information includes a quantity of wireless APs in the network deployed at the customer site whose beacon signals are received by the wireless sensors deployed at the customer site.

In an embodiment, the one or more processors are further configured to automatically determine the SLA network capacity metric based on the network capacity information for each floor at the customer site.

In an embodiment, the one or more processors are further configured to automatically determine the SLA network capacity metric based on the network capacity information for each building at the customer site.

In an embodiment, a method for network capacity management of a network deployed at a customer site involves using wireless sensors deployed at the customer site, gathering network capacity information of the network deployed at the customer site, at a cloud server connected to the network, automatically determining an SLA network capacity metric based on the network capacity information, and at the cloud server, generating an alert regarding the network deployed at the customer site when the SLA network capacity metric does not satisfy a predetermined threshold.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 6 depicts a network having multiple wireless sensors and multiple wireless APs distributed in a floor plan of the customer site.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
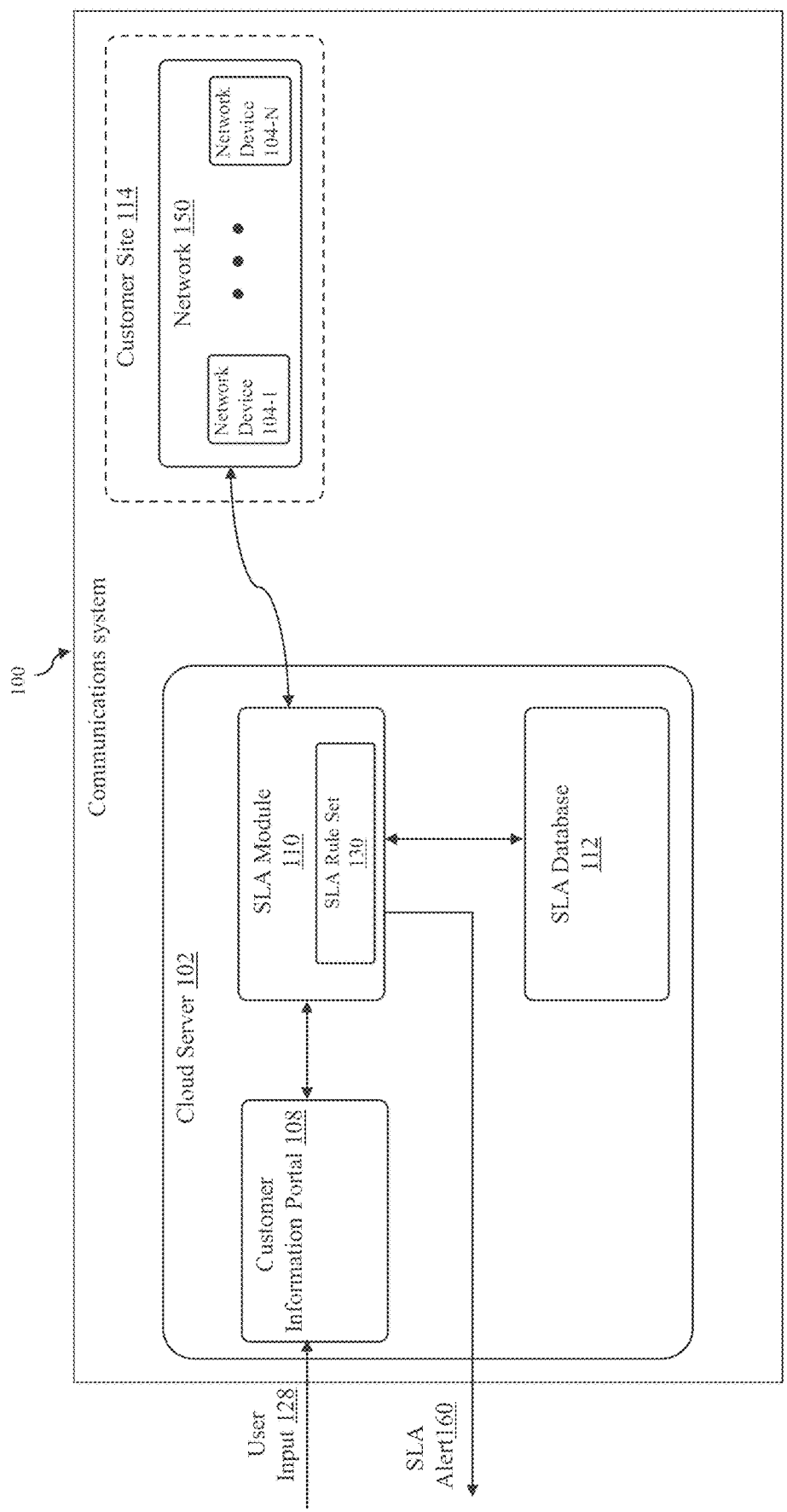
FIG. 1 depicts a communications system in accordance to an embodiment of the invention.

FIG. 1 depicts a communications system 100 in accordance to an embodiment of the invention. In the embodiment depicted in FIG. 1, the communications system includes a cloud server 102 and a deployed network 150 within a customer site 114. The cloud server and/or the network may be implemented in hardware (e.g., circuits), software, firmware, or a combination thereof. Although the illustrated communications system 100 is shown with certain components and described with certain functionality herein, other embodiments of the communications system may include fewer or more components to implement the same, less, or more functionality. For example, in some embodiments, the communications system includes more than one cloud server, more than one deployed network, and/or more than one customer site. In another example, although the cloud server and the deployed network are shown in FIG. 1 as being connected in certain topology, the network topology of the communications system 100 is not limited to the topology shown in FIG. 1.

The cloud server 102 can be used to provide at least one service to a customer site (e.g., to the deployed network 150 located at the customer site 114). The cloud server may be configured to facilitate or perform a service-level agreement (SLA) service (e.g., a specific level of network availability, coverage and/or capacity) to network devices (e.g., the deployed network 150) at the customer site. Because the cloud server can facilitate or perform an SLA service to network devices at the customer site, network management efficiency can be improved. In addition, because the cloud server can facilitate or perform an SLA service to network devices at the customer site, a user or customer of the customer site can be notified of network outage. Consequently, network outage time can be reduced. In some embodiments, the cloud server is configured to generate a user interface to obtain input information, for example, a floor plan of a customer site. In some embodiments, the user interface includes a graphical user interface. The cloud server may be implemented in hardware (e.g., circuits), software, firmware, or a combination thereof. In some embodiments, the cloud server is hosted or executed in a public cloud computing environment such as Amazon Web Services (AWS). In some embodiments, the cloud server is implemented on a server grade hardware platform, such as an x86 architecture platform. For example, the hardware platform of the cloud server may include conventional components of a computing device, such as one or more processors (e.g., central processing units (CPUs)), system memory, a network interface, storage system, and other Input/Output (I/O) devices such as, for example, a mouse and a keyboard (not shown). In some embodiments, the processor is configured to execute instructions such as, for example, executable instructions that may be used to perform one or more operations described herein and may be stored in the memory and the storage system. In some embodiments, the memory is volatile memory used for retrieving programs and processing data. The memory may include, for example, one or more random access memory (RAM) modules. In some embodiments, the network interface is configured to enable the cloud server to communicate with another device via a communication medium. The network interface may be one or more network adapters, also referred to as a Network Interface Card (NIC). In some embodiments, the cloud server includes local storage devices (e.g., one or more hard disks, flash memory modules, solid state disks and optical disks) and/or a storage interface that enables the host to communicate with one or more network data storage systems, which are used to store information, such as executable instructions, cryptographic keys, virtual disks, configurations, and other data.

In the embodiment depicted in FIG. 1, the cloud server 102 includes an SLA module 110, a customer information portal 108 connected to the SLA module 110, and an SLA database 112 configured to store SLA data. The SLA module, the customer information portal, and/or the SLA database may be implemented in hardware (e.g., circuits), software, firmware, or a combination thereof. Although the illustrated cloud server is shown with certain components and described with certain functionality herein, other embodiments of the cloud server may include fewer or more components to implement the same, less, or more functionality. For example, in some embodiments, the cloud server includes more than one SLA module, more than one customer information portal, and/or more than one SLA database. In another example, although the SLA module, the customer information portal, and the SLA database are shown in FIG. 1 as being connected in certain topology, the network topology of the cloud server is not limited to the topology shown in FIG. 1. In addition, although the customer information portal 108 is shown in FIG. 1 as being a component of the cloud server 102, in other embodiments, the customer information portal may be implemented outside of the cloud server. In some embodiments, the SLA module 110 is configured to facilitate or perform an SLA service to network devices (e.g., the deployed network 150) at the customer site 114, for example, using an SLA rule set 130. The SLA rule set 130 may include one or more SLA rules for network devices at the customer site 114, for example, for performing an SLA service to network devices at the customer site 114. In some embodiments, the SLA module 110 is configured to generate and/or transmit at least one SLA alert 160 regarding a network deployed and/or to be deployed at the customer site, for example, to an administrator or a user or customer (e.g., a layperson such as a worker on-site or an end-user such as an employee) at the customer site 114. In some embodiments, the SLA database 112 is configured to store SLA data for a network deployed and/or to be deployed at the customer site (e.g., a list of network devices deployed or to be deployed at the customer site). For example, the SLA database 112 is configured to store SLA measurement data and/or a list of specific levels of network availability, coverage and/or capacity for network devices deployed at the customer site 114. In some embodiments, the SLA database 112 is configured to store the at least one SLA alert 160. Because the SLA module can facilitate or perform an SLA service to network devices at the customer site, network management efficiency can be improved. In addition, because the SLA deployment module can facilitate or perform an SLA service to network devices at the customer site, a user or customer (e.g., a layperson such as a worker on-site or an end-user such as an employee) at the customer site can be notified of network conditions or outrages. Consequently, network outage time can be shortened. The customer information portal 108 is configured to receive customer input 128. In some embodiments, the customer information portal is configured to include or generate a user interface that allows a customer to input information related to the customer site 114 (e.g., the floor plan of the customer site 114) and/or information associated with an SLA service for the customer site 114, such as one or more specific requirements or restrictions.

In the communications system 100 depicted in FIG. 1, the customer site 114 may include one or more buildings, and each building may include one or more floors. Network devices that can be deployed at the customer site may include any type of suitable network devices. For example, network devices may be designated to be deployed to a specific building, a specific floor within a building, and/or a specific location on a floor of a building. A network device that can be deployed at the customer site may be fully or partially implemented as an Integrated Circuit (IC) device. In the embodiment depicted in FIG. 1, the network 150 includes one or more network devices 104-1, . . . , 104-N, where N is a positive integer. In some embodiments, at least one of the one or more network devices 104-1, . . . , 104-N is a wired and/or wireless communications device that includes at least one processor (e.g., a microcontroller, a digital signal processor (DSP), and/or a CPU), at least one wired or wireless communications transceiver implemented in one or more logical circuits and/or one or more analog circuits, at least one wired or wireless communications interface and that supports at least one wired or wireless communications protocol, and/or at least one antenna. For example, at least one of the one or more network devices 104-1, . . . , 104-N may be compatible with Institute of Electrical and Electronics Engineers (IEEE) 802.3 protocol and/or one or more wireless local area network (WLAN) communications protocols, such as IEEE 802.11 protocol. In some embodiments, at least one of the one or more network devices 104-1, . . . , 104-N is a wired communications device that is compatible with at least one wired local area network (LAN) communications protocol, such as a wired router (e.g., an Ethernet router), a wired switch, a wired hub, or a wired bridge device (e.g., an Ethernet bridge). In some embodiments, at least one of the one or more network devices 104-1, . . . , 104-N is a wireless access point (AP) that connects to a local area network (e.g., a LAN) and/or to a backbone network (e.g., the Internet) through a wired connection and that wirelessly connects to wireless stations (STAs), for example, through one or more WLAN communications protocols, such as an IEEE 802.11 protocol. In some embodiments, the network 150 includes at least one distribution switch (DS) or distribution layer switch that functions as a bridge between a core layer switch and an access layer switch, at least one head end (HE) or gateway, at least one access switch (AS) that can directly interact with a lower-level device (e.g., a wireless AP), at least one wireless AP, and/or at least one wireless sensor that wirelessly connects to a wireless AP. In some embodiments, at least one of the one or more network devices 104-1, . . . , 104-N is a wireless station (STA) that wirelessly connects to a wireless AP. For example, at least one of the one or more network devices 104-1, . . . , 104-N may be a laptop, a desktop personal computer (PC), a mobile phone, or other wireless device that supports at least one WLAN communications protocol (e.g., an IEEE 802.11 protocol)).

Figure 2:
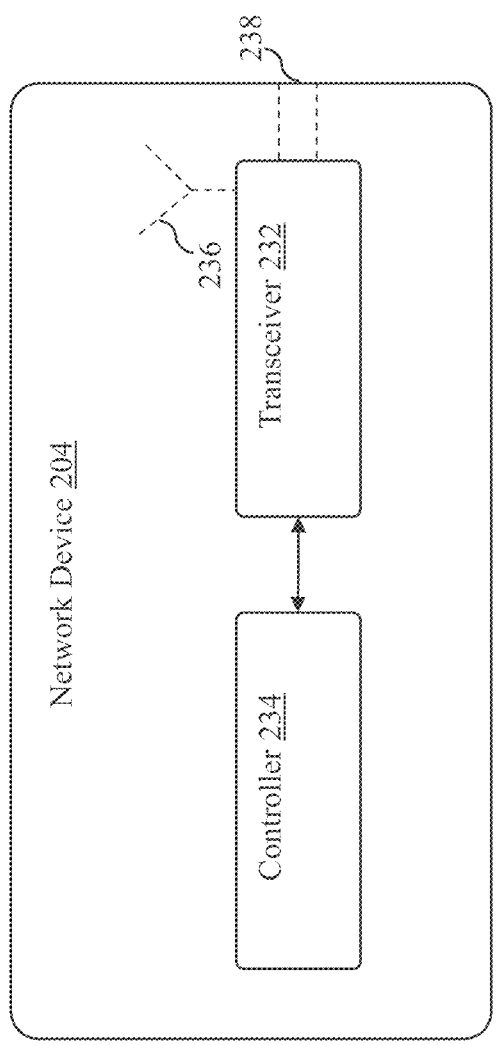
FIG. 2 depicts an embodiment of a network device of the communications system depicted in FIG. 1.

FIG. 2 depicts an embodiment of a network device 204 of the communications system depicted in FIG. 1. The network device 204 may be an embodiment of a network device that is included in the deployed network 150 depicted in FIG. 1. However, network devices that can be included in the deployed network 150 depicted in FIG. 1 are not limited to the embodiment depicted in FIG. 2. The network device 204 may be any suitable type of network device. For example, the network device 204 may be a distribution switch, a gateway, an access switch, a wireless access point, or a sensor, described in details with reference to FIG. 3. In the embodiment depicted in FIG. 2, a network device 204 includes a wireless and/or wired transceiver 232, a controller 234 operably connected to the transceiver 232, at least one optional antenna 236 operably connected to the transceiver 232, and at least one optional network port 238 operably connected to the transceiver 232. In some embodiments, the transceiver 232 includes a physical layer (PHY) device. The transceiver 232 may be any suitable type of transceiver. For example, the transceiver 232 may be a short-range communications transceiver (e.g., a Bluetooth transceiver) or a WLAN transceiver (e.g., a transceiver compatible with an IEEE 802.11 protocol). In some embodiments, the network device 204 includes multiple transceivers, for example, a short-range communications transceiver (e.g., a Bluetooth transceiver) and a WLAN transceiver (e.g., a transceiver compatible with an IEEE 802.11 protocol). In some embodiments, the network device (e.g., a wireless AP) includes multiple antennas and multiple wireless transceivers that share the antennas. In some embodiments, the controller 234 is configured to control the transceiver 232 to process packets received through the antenna 236 and/or the network port 238 and/or to generate outgoing packets to be transmitted through the antenna 236 and/or the network port 238. In some embodiments, the controller 234 is configured to probe for SLA information relevant to the network device 204. For example, the controller 234 may be configured to probe for network availability information, network coverage information, and/or network capacity information relevant to the network device 204. The antenna 236 may be any suitable type of antenna. For example, the antenna 236 may be an induction type antenna such as a loop antenna or any other suitable type of induction type antenna. However, the antenna 236 is not limited to an induction type antenna. The network port 238 may be any suitable type of port. For example, the network port 238 may be a local area network (LAN) network port such as an Ethernet port. However, the network port 238 is not limited to LAN network ports. In some embodiments, the network device 204 is a DS, a HE or gateway, an AS, a wireless AP, or a wireless sensor that wirelessly connects to a wireless AP.

Figure 3:
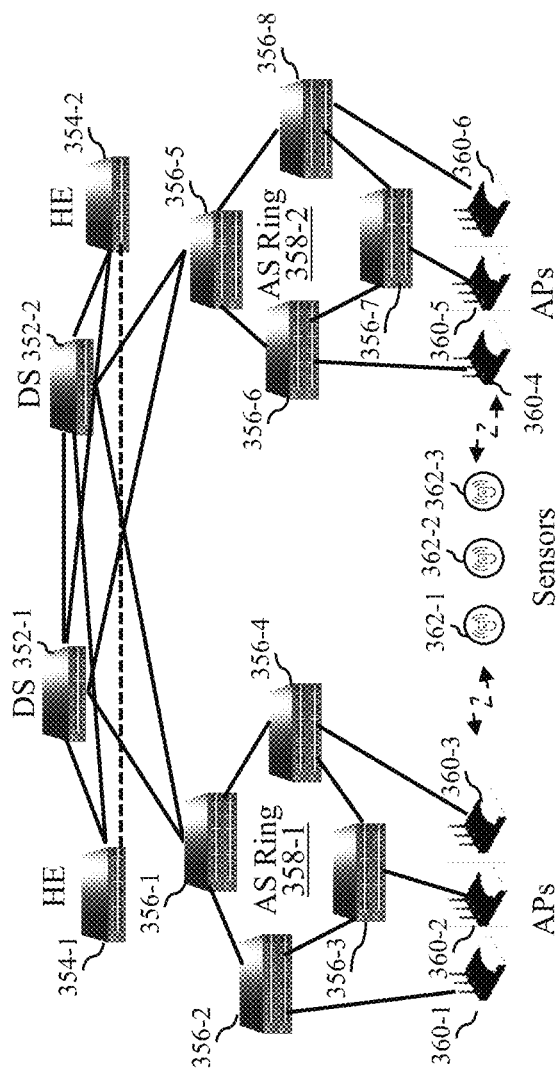
FIG. 3 depicts an embodiment of a network service block (NSB) for a customer site.

FIG. 3 depicts an embodiment of a network service block (NSB) 350 for the customer site 114. The NSB 350 depicted in FIG. 3 is one possible embodiment of the deployed network 150 at the customer site 114 depicted in FIG. 1. However, the deployed network 150 at the customer site 114 depicted in FIG. 1 are not limited to the embodiment shown in FIG. 3. In some embodiments, the NSB 350 is a basic building block for providing connectivity as a service and is a replicable block that can be scaled (e.g., expanded) to meet any deployment. In the embodiment depicted in FIG. 3, the NSB 350 includes a pair of distribution switches (DSs) or distribution layer switches 352-1, 352-2 that are aggregation switches functioning as a bridge between core layer switches and access layer switches, a pair of head ends (HEs) or gateways 354-1, 354-2, a number of access switches (ASs) 356-1, 356-2, 356-3, 356-4, 356-5, 356-6, 356-7, 356-8 connected in rings 358-1, 358-2 that can directly interact with lower level devices (e.g., wireless APs), a number of wireless APs 360-1, 360-2, 360-3, 360-4, 360-5, 360-6 connected to the ASs, and a number of wireless sensors 362-1, 362-2, 362-3 that wirelessly connect to the wireless APs. In some embodiments, the number of HEs and DSs is constant in the NSB 350 while the number of the wireless APs, the ASs, and the sensors in the NSB 350 varies. In some embodiments, at least one of the DSs 352-1, 352-2, the HEs 354-1, 354-2, the ASs 356-1, 356-2, 356-3, 356-4, 356-5, 356-6, 356-7, 356-8, the wireless APs 360-1, 360-2, 360-3, 360-4, 360-5, 360-6, and the wireless sensors 362-1, 362-2, 362-3 depicted in FIG. 3 is implemented as the network device 204 depicted in FIG. 2.

In some embodiments, at least one wireless sensor (e.g., the wireless sensor 362-1, 362-2, or 362-3) is installed in the customer site 114 to measure and monitor SLA information at the customer site 114. For example, one or more wireless sensors are installed in the customer site 114 to measure and monitor SLA information of the deployed network 150 (e.g., the NSB 350) at the customer site 114. In some embodiments, at least one wireless sensor is installed in the customer site 114 to measure and monitor wireless connection availability at the customer site 114, for example, wireless connection availability of the deployed network 150 (e.g., the NSB 350) at the customer site 114. In some embodiments, at least one wireless sensor is installed in the customer site 114 to measure and monitor wireless network coverage at the customer site 114, for example, wireless network coverage of the deployed network 150 (e.g., the NSB 350) at the customer site 114. In some embodiments, at least one wireless sensor is installed in the customer site 114 to measure and monitor wireless network capacity at the customer site 114, for example, wireless network capacity of the deployed network 150 (e.g., the NSB 350) at the customer site 114. In some embodiments, at least one wireless sensor is installed in the customer site 114 to measure and monitor wireless connection availability, wireless network coverage, and wireless network capacity at the customer site 114, for example, wireless connection availability, wireless network coverage, and wireless network capacity of the deployed network 150 (e.g., the NSB 350) at the customer site 114. In some embodiments, the at least one wireless sensor does not have wired communications capabilities, e.g., Ethernet or Power over Ethernet function. The at least one wireless sensor can be plugged directly into at least one wall power outlet and can be installed at ground level thus mimicking at least one real client device. In some embodiments, multiple wireless sensors are installed across the deployed network 150 (e.g., the NSB 350) using a mobile app and connect seamlessly to at least one wireless AP to communicate with the cloud server 102 (e.g., the SLA module 110 in the cloud server 102).

Figure 4:
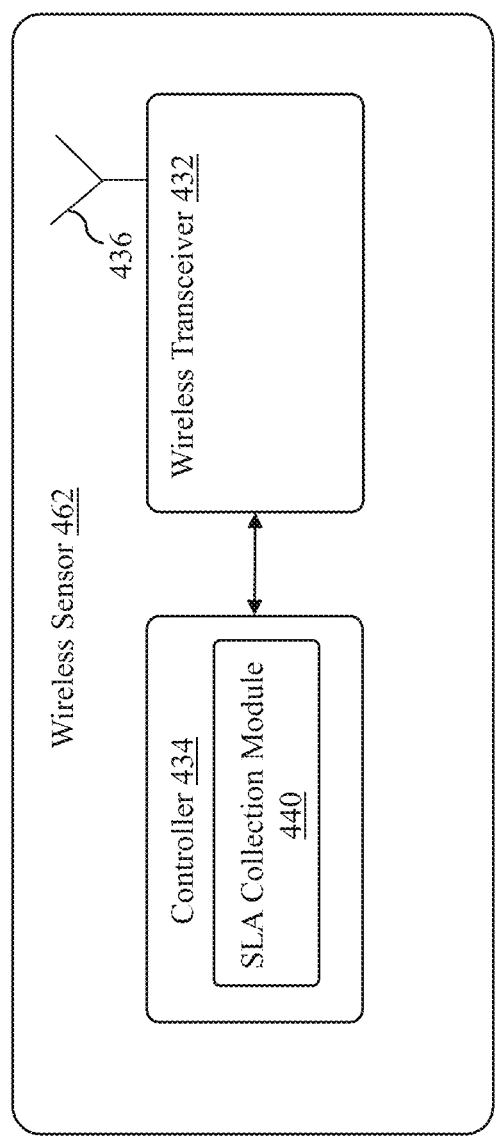
FIG. 4 depicts an embodiment of a wireless sensor that can be installed in a customer site to measure and monitor SLA information at the customer site.

FIG. 4 depicts an embodiment of a wireless sensor 462 that can be installed in the customer site 114 to measure and monitor SLA information at the customer site 114. The wireless sensor 462 depicted in FIG. 4 is one possible embodiment of wireless sensors (e.g., the wireless sensor 362-1, 362-2, or 362-3) that can be installed at the customer site 114 depicted in FIG. 1. However, wireless sensors that can be installed at the customer site 114 depicted in FIG. 1 are not limited to the embodiment shown in FIG. 4. In the embodiment depicted in FIG. 4, the wireless sensor 462 includes a wireless transceiver 432, a controller 434 operably connected to the wireless transceiver 432, and at least one antenna 436 operably connected to the wireless transceiver 432. The wireless transceiver 432 may be any suitable type of transceiver. For example, the wireless transceiver 432 may be a short-range communications transceiver (e.g., a Bluetooth) or a WLAN transceiver (e.g., a transceiver compatible with an IEEE 802.11 protocol). In some embodiments, the wireless sensor 462 includes multiple wireless transceivers, for example, a short-range communications transceiver (e.g., a Bluetooth) and a WLAN transceiver (e.g., a transceiver compatible with an IEEE 802.11 protocol). In some embodiments, the controller 434 is configured to control the wireless transceiver 432 to process packets received through the antenna 436 and/or to generate outgoing packets to be transmitted through the antenna 436. In some embodiments, the controller 434 is configured to probe for SLA information relevant to the wireless sensor 462. For example, the controller 434 may be configured to probe for network availability information, network coverage information, and/or network capacity information relevant to the wireless sensor 462. In some embodiments, the controller 434 includes an SLA collection module 440 configured to measure and monitor SLA information at the customer site 114. For example, the SLA collection module 440 is configured to measure and monitor SLA information of the deployed network 150 (e.g., the NSB 350) at the customer site 114. In some embodiments, the SLA collection module 440 is configured to measure and monitor wireless connection availability at the customer site 114, for example, wireless connection availability of the deployed network 150 (e.g., the NSB 350) at the customer site 114. In some embodiments, the SLA collection module 440 is configured to measure and monitor wireless network coverage at the customer site 114, for example, wireless network coverage of the deployed network 150 (e.g., the NSB 350) at the customer site 114. In some embodiments, the SLA collection module 440 is configured to measure and monitor wireless network capacity at the customer site 114, for example, wireless network capacity of the deployed network 150 (e.g., the NSB 350) at the customer site 114. In some embodiments, the SLA collection module 440 is configured to measure and monitor wireless connection availability, wireless network coverage, and wireless network capacity at the customer site 114, for example, wireless connection availability, wireless network coverage, and wireless network capacity of the deployed network 150 (e.g., the NSB 350) at the customer site 114. The antenna 436 may be any suitable type of antenna. For example, the antenna 436 may be an induction type antenna such as a loop antenna or any other suitable type of induction type antenna. However, the antenna 436 is not limited to an induction type antenna.

In some embodiments, in addition to using one or more physical sensors (e.g., the wireless sensor 140 depicted in FIG. 4) to measure and monitor SLA information at the customer site 114, one or more virtual sensors are also used to measure and monitor SLA information at the customer site 114. For example, at least one component of at least one wireless AP is used as a virtual sensor. In some embodiments, a wireless AP that is deployed at the customer site 114 includes multiple radio interfaces and one of the radio interfaces is used as a virtual sensor to measure and monitor SLA information at the customer site 114.

Turning back to FIG. 1, in some embodiments, the cloud server 102 (e.g., the SLA module 110 in the cloud server 102) includes memory and one or more processors (e.g., one or more microcontrollers, one or more DSPs, and/or one or more CPUs) configured to receive network availability information of the network deployed at the customer site from at least one wireless sensor deployed at the customer site, receive wireless communications channel quality information of the network deployed at the customer site, and automatically determine an SLA network availability metric based on the network availability information and the wireless communications channel quality information. The one or more processors may be further configured to generate an alert regarding the network deployed at the customer site (e.g., to an administrator) when the SLA network availability metric does not satisfy a predetermined threshold. In some embodiments, the SLA network availability metric includes a percentage of time in which a predetermined network availability is satisfied in a time unit, and the one or more processors are further configured to generate the alert regarding the network deployed at the customer site when the percentage of time in which the predetermined network availability is satisfied in the time unit is lower than the predetermined threshold. The wireless communications channel quality information may include noise floor information, interference information, and channel utilization information of a wireless communications channel between the at least one wireless sensor and at least one wireless AP. In some embodiments, the one or more processors are further configured to calculate a channel quality score based on the noise floor information, the interference information, and the channel utilization information of the wireless communications channel. The one or more processors may be further configured to keep the SLA network availability metric when the channel quality score is below a channel quality threshold. In some embodiments, the network availability information includes probing information between the at least one wireless sensor and the network deployed at the customer site. In some embodiments, the one or more processors are further configured to automatically determine the SLA network availability metric based on the network availability information and the wireless communications channel quality information for each floor at the customer site. In some embodiments, the one or more processors are further configured to automatically determine the SLA network availability metric based on the network availability information and the wireless communications channel quality information for each building at the customer site. In some embodiments, the one or more processors are further configured to receive network coverage and/or capacity information of the network deployed at the customer site and automatically determining an SLA network coverage and/or capacity metric based on the network coverage and/or capacity information.

In some embodiments, the cloud server 102 (e.g., the SLA module 110 in the cloud server 102) includes memory and one or more processors (e.g., one or more microcontrollers, one or more DSPs, and/or one or more CPUs) configured to receive network capacity information of the network deployed at the customer site from wireless sensors deployed at the customer site and automatically determine an SLA network capacity metric based on the network capacity information. In some embodiments, the one or more processors are further configured to generate an alert regarding the network deployed at the customer site (e.g., to an administrator) when the SLA network capacity metric does not satisfy a predetermined threshold. In some embodiments, the SLA network capacity metric includes a percentage of time in which a predetermined network capacity is satisfied in a time unit, and the one or more processors are further configured to generate the alert regarding the network deployed at the customer site when the percentage of time in which the predetermined network capacity is satisfied in the time unit is lower than the predetermined threshold. In some embodiments, the network capacity information includes information regarding wireless APs in the network deployed at the customer site whose beacon signals are received by the wireless sensors deployed at the customer site. The information regarding the wireless APs in the network deployed at the customer site whose beacon signals are received by the wireless sensors deployed at the customer site may include beacon AP reports from the wireless sensors. In some embodiments, each of the beacon AP reports contains at least one wireless AP in the network deployed at the customer site whose beacon signal is received by a respective wireless sensor of the wireless sensors deployed at the customer site. The network capacity information may include a quantity of wireless APs in the network deployed at the customer site whose beacon signals are received by the wireless sensors deployed at the customer site. In some embodiments, the one or more processors are further configured to automatically determine the SLA network capacity metric based on the network capacity information for each floor at the customer site. In some embodiments, the one or more processors are further configured to automatically determine the SLA network capacity metric based on the network capacity information for each building at the customer site. In some embodiments, the one or more processors are further configured to receive network availability and/or coverage information of the network deployed at the customer site and automatically determine an SLA network availability and/or coverage metric based on the network availability and/or coverage information.

In some embodiments, the cloud server 102 (e.g., the SLA module 110 in the cloud server 102) includes memory and one or more processors (e.g., one or more microcontrollers, one or more DSPs, and/or one or more CPUs) configured to receive network coverage information of the network deployed at the customer site from wireless sensors deployed at the customer site and automatically determine an SLA network coverage metric based on the network coverage information. In some embodiments, the one or more processors are further configured to generate an alert regarding the network deployed at the customer site (e.g., to an administrator) when the SLA network coverage metric does not satisfy a predetermined threshold. In some embodiments, the SLA network coverage metric includes a percentage of time in which a predetermined network coverage is satisfied in a time unit, and the one or more processors are further configured to generate the alert regarding the network deployed at the customer site when the percentage of time in which the predetermined network coverage is satisfied in the time unit is lower than the predetermined threshold. In some embodiments, the network coverage information includes signal strength information regarding wireless APs in the network deployed at the customer site whose signals are received by the wireless sensors deployed at the customer site. The information regarding the wireless APs in the network deployed at the customer site whose signals are received by the wireless sensors deployed at the customer site may include AP signal strength reports from the wireless sensors. In some embodiments, each of the AP signal strength reports contains signal strength information of at least one wireless AP in the network deployed at the customer site whose signal is received by a respective wireless sensor of the wireless sensors deployed at the customer site. In some embodiments, the network coverage information comprises highest signal strength information of wireless access points (APs) in the network deployed at the customer site whose signals are received by the wireless sensors deployed at the customer site. In some embodiments, the one or more processors are further configured to automatically determine the SLA network coverage metric based on the network coverage information for each floor at the customer site. In some embodiments, the one or more processors are further configured to automatically determine the SLA network coverage metric based on the network coverage information for each building at the customer site. In some embodiments, the one or more processors are further configured to receive network availability and/or coverage information of the network deployed at the customer site and automatically determine an SLA network availability and/or coverage based on the network availability and/or coverage information.

Figure 5:
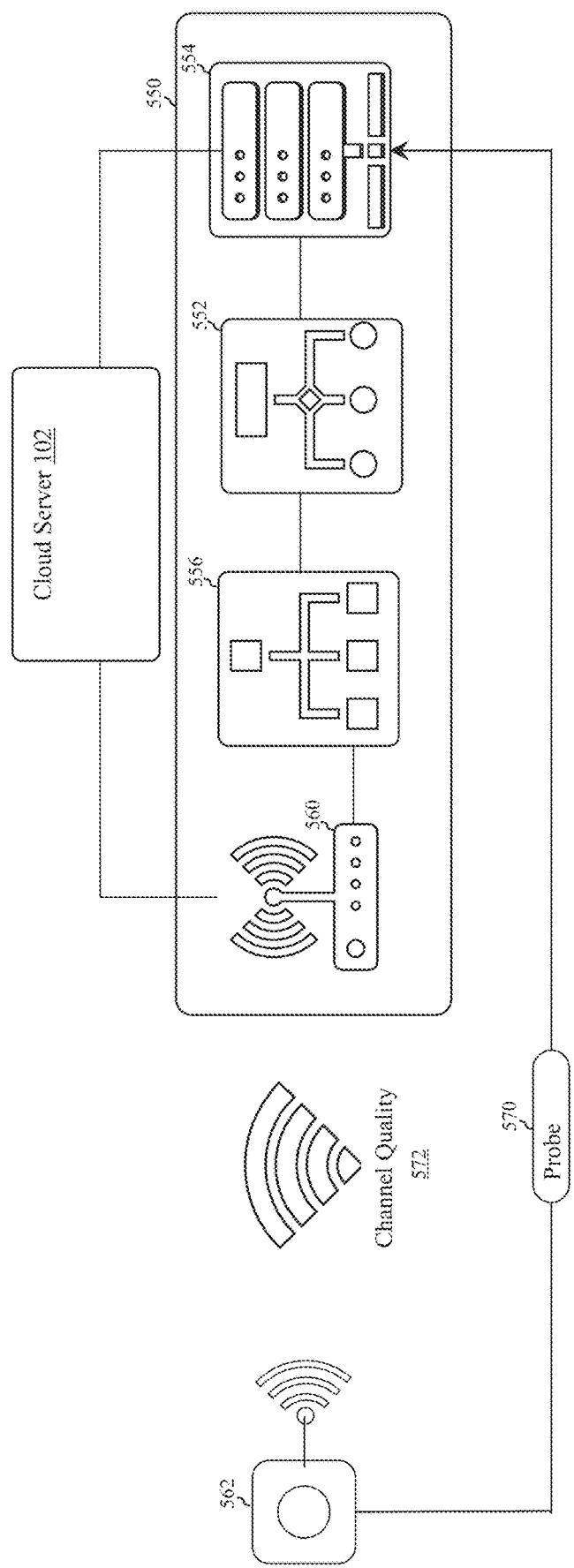
FIG. 5 depicts an interaction of a wireless sensor with a network that includes at least one wireless access point (AP), at least one access switch (AS), at least one distribution switch (DS), and at least one head end (HE) to measure and monitor SLA information relevant to the network.

FIG. 5 depicts an interaction of a wireless sensor 562 with a network 550 that includes at least one wireless AP 560, at least one AS 556, at least one DS 552, and at least one HE 554 to measure and monitor SLA information relevant to the network 550. The wireless sensor 562 depicted in FIG. 5 may be similar to or the same as the wireless sensor 362-1, 362-2, or 362-3 depicted in FIG. 3 and/or the wireless sensor 462 depicted in FIG. 4. The network 550 is one possible network that can be deployed at the customer site 114 depicted in FIG. 1. However, networks that can be installed at the customer site 114 depicted in FIG. 1 are not limited to the embodiment shown in FIG. 5. The at least one wireless AP 560, the at least one AS 556, the at least one DS 552, and the at least one HE 554 depicted in FIG. 5 may be similar to or the same as the wireless APs 360-1, 360-2, 360-3, 360-4, 360-5, 360-6, the ASs 356-1, 356-2, 356-3, 356-4, 356-5, 356-6, 356-7, 356-8, the DSs 352-1, 352-2, and the HEs 354-1, 354-2 depicted in FIG. 3, respectively. As depicted in FIG. 5, the wireless sensor 562 wirelessly connects to the wireless AP 560 and probes the at least one HE 554, for example, using at least one probe request 570. In some embodiments, the wireless sensor 562 sends out the at least one probe request 570 to the at least one HE 554, which traverses the network 550 through the at least one DS 552, the at least one AS 556, and the at least one wireless AP 560, thus testing availability of the network 550 end-to-end. In some embodiments, when there is 100% probe loss, the wireless sensor 562 is not able to communicate with the cloud server 102 (e.g., the SLA module 110 in the cloud server 102) and buffers the probe result until the connection to the cloud server 102 is restored. A unit time (e.g., a minute) in which the wireless sensor 562 is not able to communicate with the cloud server 102 may be considered a violation unit time. For example, a minute in which the wireless sensor 562 is not able to communicate with the cloud server 102 may be considered a violation minute. The cloud server 102 (e.g., the SLA module 110 in the cloud server 102) can keep track of all violation unit time (e.g., violation minutes) and calculates the percentage of time the infrastructure (e.g., the network 550) is available. However, because the probing is performed over the wireless channel or medium, probe losses can occur due to poor wireless communications channel quality, which is not controlled by the cloud server 102 (e.g., the SLA module 110 in the cloud server 102). In some embodiments, wireless communications channel quality 572 is calculated using data from the at least one wireless AP 560. In some embodiments, the radio interface of the at least one wireless AP 560 is configured to provide a number of wireless communications channel metrics such as the noise floor, non-Wi-Fi interference, and channel utilization of the wireless communications channel between the wireless sensor 562 and the at least one wireless AP 560. The cloud server 102 (e.g., the SLA module 110 in the cloud server 102) may calculate a channel quality score based on the noise floor, non-Wi-Fi interference, and channel utilization of the wireless communications channel between the wireless sensor 562 and the at least one wireless AP 560. In some embodiments, the channel quality score is between 0 to 100 where 100 is considered unusable. When there is a probe loss, the cloud server 102 (e.g., the SLA module 110 in the cloud server 102) checks wireless communications channel quality values (matching test duration) from the at least one wireless AP 560. If wireless communications channel quality is poor (e.g., below a specific channel quality threshold), an event is generated by the cloud server 102 (e.g., the SLA module 110 in the cloud server 102). However, the unit time (e.g., the minute) in which wireless communications channel quality is poor (e.g., below a specific threshold) is not considered a violation unit time (e.g., a violation minute) and the percentage of time for availability and the SLA is not affected. In some embodiments, the cloud server 102 (e.g., the SLA module 110 in the cloud server 102) gathers or probes for data from the network 550 and triangulates to identify if the probe loss is due to poor wireless communications channel quality or unavailable network infrastructure. When the probe loss is due to unavailable network infrastructure, the cloud server 102 (e.g., the SLA module 110 in the cloud server 102) may count the unit time (e.g., the minute) as a violation unit time (e.g., a violation minute). In some embodiments, the cloud server 102 (e.g., the SLA module 110 in the cloud server 102) is configured to keep track of all violation unit time (e.g., all violation minutes) and calculate the percentage of time in which the network infrastructure is available. In some embodiments, the cloud server 102 (e.g., the SLA module 110 in the cloud server 102) is configured to use a channel plan algorithm to constantly check the health of the wireless communications channel between the wireless sensor 562 and the at least one wireless AP 560. If the wireless communications channel is unusable, the cloud server 102 (e.g., the SLA module 110 in the cloud server 102) is configured to use the channel plan algorithm to switch the wireless communications channel. The cloud server 102 (e.g., the SLA module 110 in the cloud server 102) may be configured to calculate network infrastructure availability as an uptime using the following weighted average formula:

$$\% \text{ Uptime} = \frac{(\text{Total Time Units} - \text{Violation Time Units})}{\text{Total Time Units}}, \quad (1)$$

where % Uptime represents the uptime percentage, Total Time Units represents the total time units for network infrastructure availability calculation, and Violation Time Units represents unit time in violation (i.e., the network infrastructure is not available). Although equation (1) is provided as an example, network infrastructure availability can be calculated in other ways, such as using other time-based functions or using lookup tables. The cloud server 102 (e.g., the SLA module 110 in the cloud server 102) can calculate uptime in any suitable time unit, for example, in a minute-based uptime, in a quarter hour-based uptime, in an hour-based uptime, and/or in a day-based uptime. In some embodiments, the cloud server 102 (e.g., the SLA module 110 in the cloud server 102) is configured to calculate network infrastructure availability as an uptime using the following weighted average formula:

$$\% \text{ Uptime} = \frac{(\text{Total Minutes} - \text{Violation Minutes})}{\text{Total Minutes}}, \quad (2)$$

where % Uptime represents the uptime percentage, Total Minutes represents the total minutes for network infrastructure availability calculation, and Violation Minutes represents minutes in violation (i.e., the network infrastructure is not available). Although equation (2) is provided as an example, network infrastructure availability can be calculated in other ways. The cloud server 102 (e.g., the SLA module 110 in the cloud server 102) may be configured to calculate network infrastructure availability as an uptime at a particular time interval, for example, every day, every week, or every month (e.g., at the end of the month). The cloud server 102 (e.g., the SLA module 110 in the cloud server 102) may compare the uptime percentage with a committed uptime to identify an SLA violation. In some embodiments, network availability SLA is committed and calculated on a per building basis such that the cloud server 102 (e.g., the SLA module 110 in the cloud server 102) uses a weighted average of network infrastructure availability for all wireless sensors in a specific building to calculate network infrastructure availability of the specific building.

Figure 6:
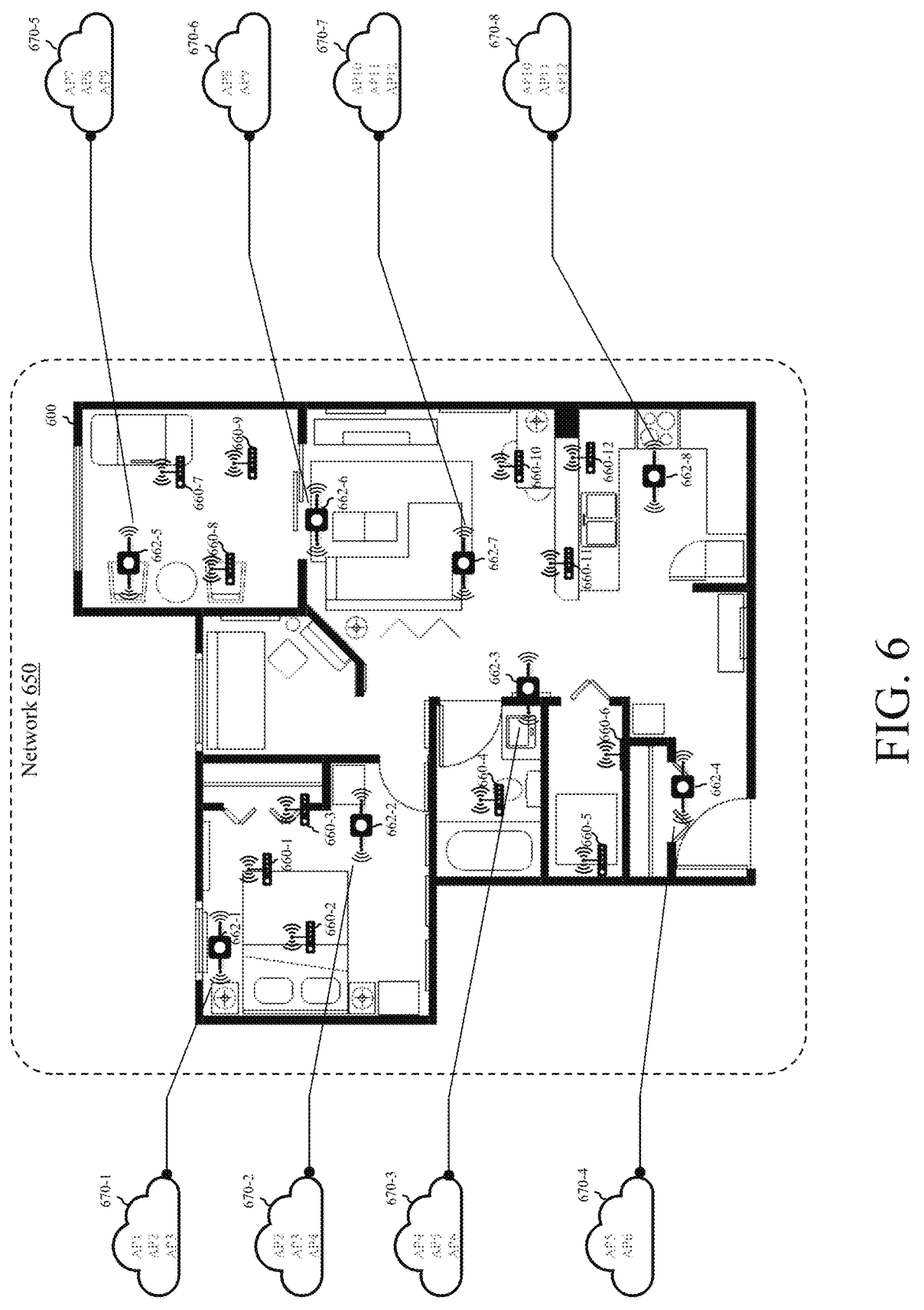

FIG. 6 depicts a network 650 having eight wireless sensors 662-1, 662-2, 662-3, 662-4, 662-5, 662-6, 662-7, 662-8 and twelve wireless APs 660-1, 660-2, 660-3, 660-4, 660-5, 660-6, 660-7, 660-8, 660-9, 660-10, 660-11, 660-12 distributed in a floor plan 600 of the customer site 114. The network 650 is one possible network that can be deployed at the customer site 114 depicted in FIG. 1. However, networks that can be installed at the customer site 114 depicted in FIG.

1 are not limited to the embodiment shown in FIG. 6. The wireless sensors 662-1, 662-2, 662-3, 662-4, 662-5, 662-6, 662-7, 662-8 depicted in FIG. 6 may be similar to or the same as the wireless sensor 362-1, 362-2, or 362-3 depicted in FIG. 3 and/or the wireless sensor 462 depicted in FIG. 4. The wireless APs 660-1, 660-2, 660-3, 660-4, 660-5, 660-6, 660-7, 660-8, 660-9, 660-10, 660-11, 660-12 depicted in FIG. 6 may be similar to or the same as the wireless APs 360-1, 360-2, 360-3, 360-4, 360-5, 360-6 depicted in FIG. 3.

In some embodiments, the wireless sensors 662-1, 662-2, 662-3, 662-4, 662-5, 662-6, 662-7, 662-8 are configured to probe for network capacity information at the customer site 114 (FIG. 1). In some embodiments, each of the wireless sensors 662-1, 662-2, 662-3, 662-4, 662-5, 662-6, 662-7, 662-8 scans airwaves to probe for information of respective one or more beaconing APs to generate a beacon report and to transmit the beacon report to the cloud server 102 (e.g., the SLA module 110 in the cloud server 102). For example, the wireless sensor 662-1 scans the wireless communications channel to probe for information of respective one or more beaconing APs and generates a beacon report 670-1, which contains AP1, AP2, AP3 (corresponding to the wireless APs 360-1, 360-2, 360-3), and transmits the beacon report 670-1 to the cloud server 102 (e.g., the SLA module 110 in the cloud server 102). The wireless sensor 662-2 scans the wireless communications channel to probe for information of respective one or more beaconing APs and generates a beacon report 670-2, which contains AP2, AP3, AP4 (corresponding to the wireless APs 360-2, 360-3, 360-4), and transmits the beacon report 670-2 to the cloud server 102 (e.g., the SLA module 110 in the cloud server 102). The wireless sensor 662-3 scans the wireless communications channel to probe for information of respective one or more beaconing APs and generates a beacon report 670-3, which contains AP4, AP5, AP6 (corresponding to the wireless APs 360-4, 360-5, 360-6), and transmits the beacon report 670-3 to the cloud server 102 (e.g., the SLA module 110 in the cloud server 102). The wireless sensor 662-4 scans the wireless communications channel to probe for information of respective one or more beaconing APs and generates a beacon report 670-4, which contains AP5, AP6 (corresponding to the wireless APs 360-5, 360-6), and transmits the beacon report 670-4 to the cloud server 102 (e.g., the SLA module 110 in the cloud server 102). The wireless sensor 662-5 scans the wireless communications channel to probe for information of respective one or more beaconing APs and generates a beacon report 670-5, which contains AP7, AP8, AP9 (corresponding to the wireless APs 360-7, 360-8, 360-9), and transmits the beacon report 670-5 to the cloud server 102 (e.g., the SLA module 110 in the cloud server 102). The wireless sensor 662-6 scans the wireless communications channel to probe for information of respective one or more beaconing APs and generates a beacon report 670-6, which contains AP8, AP9 (corresponding to the wireless APs 360-8, 360-9), and transmits the beacon report 670-6 to the cloud server 102 (e.g., the SLA module 110 in the cloud server 102). The wireless sensor 662-7 scans the wireless communications channel to probe for information of respective one or more beaconing APs and generates a beacon report 670-7, which contains AP10, AP11, AP12 (corresponding to the wireless APs 360-10, 360-11, 360-12), and transmits the beacon report 670-7 to the cloud server 102 (e.g., the SLA module 110 in the cloud server 102). The wireless sensor 662-8 scans the wireless communications channel to probe for information of respective one or more beaconing APs and generates a beacon report 670-8, which contains AP10, AP11, AP12 (corresponding to the wireless APs 360-10, 360-11, 360-12), and transmits the beacon report 670-8 to the cloud server 102 (e.g., the SLA module 110 in the cloud server 102).

In some embodiments, capacity is committed or defined based on the number of APs per floor. In some embodiments, the cloud server 102 (e.g., the SLA module 110 in the cloud server 102) analyzes data (e.g., beacon reports) from all of the wireless sensors 662-1, 662-2, 662-3, 662-4, 662-5, 662-6, 662-7, 662-8 on a particular floor to verify if the committed number of wireless APs are heard on that floor (e.g., beacon signals of the committed number of wireless APs are received or detected by the wireless sensors 662-1, 662-2, 662-3, 662-4, 662-5, 662-6, 662-7, 662-8). In these embodiments, if the committed capacity is not met at a particular time unit (e.g., a particular minute), the cloud server 102 (e.g., the SLA module 110 in the cloud server 102) considers that the particular time unit to be in violation or lost. In some embodiments, the cloud server 102 (e.g., the SLA module 110 in the cloud server 102) keeps track of all of the time units in violation and calculates the percentage of time in which the network capacity is met or satisfied using the following weighted average formula:

$$POTC = \frac{(\text{Total Time Units} - \text{Violation Time Units})}{\text{Total Time Units}}, \quad (3)$$

where POTC represents the percentage of time in which the network capacity is met or satisfied, Total Time Units represents the total time units for network capacity calculation, and Violation Time Units represents unit time in violation (i.e., the network capacity is not met). Although equation (3) is provided as an example, network capacity can be calculated in other ways, such as using other time-based functions or using lookup tables. The cloud server 102 (e.g., the SLA module 110 in the cloud server 102) can calculate the percentage of time in which the network capacity is met or satisfied in any suitable time unit, for example, in a minute, in a quarter hour, in an hour, and/or in a day. In some embodiments, the cloud server 102 (e.g., the SLA module 110 in the cloud server 102) is configured to calculate the percentage of time in which the network capacity is met or satisfied using the following weighted average formula:

$$POTC = \frac{(\text{Total Minutes} - \text{Violation Minutes})}{\text{Total Minutes}}, \quad (4)$$

where POTC represents the percentage of minutes in which the network capacity is met or satisfied, Total Minutes represents the total minutes for network capacity calculation, and Violation Minutes represents minutes in violation (i.e., the network capacity is not met). Although equation (4) is provided as an example, network capacity can be calculated in other ways. The cloud server 102 (e.g., the SLA module 110 in the cloud server 102) may be configured to calculate the percentage of minutes in which the network capacity is met or satisfied at a particular time interval, for example, every day, every week, or every month (e.g., at the end of the month). The cloud server 102 (e.g., the SLA module 110 in the cloud server 102) may compare a calculated network capacity with a committed network capacity to identify an SLA violation. In some embodiments, network capacity SLA is committed and calculated on a per building basis such that the cloud server 102 (e.g., the SLA module 110 in the cloud server 102) uses a weighted average of network capacity for all wireless sensors in a specific building to calculate network capacity of the specific building.

Figure 7:
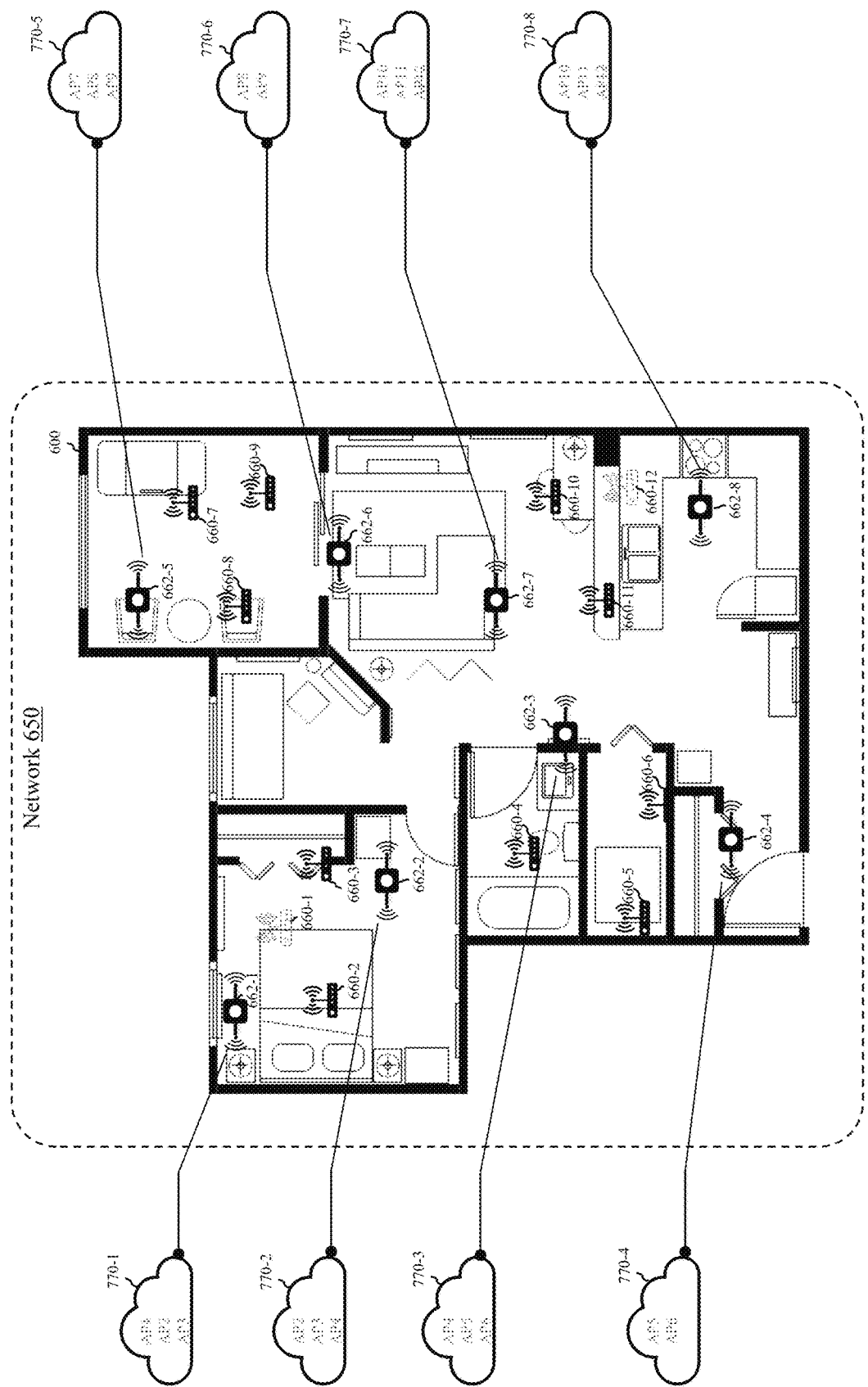
FIG. 7 depicts the network depicted in FIG. 6 with updated beacon reports.

FIG. 7 depicts the network 650 depicted in FIG. 6 with updated beacon reports 770-1, 770-2, 770-3, 770-4, 770-5, 770-6, 770-7, 770-8. In the embodiment depicted in FIG. 7, the wireless APs 660-1, 660-12 malfunction and lost wireless connection capacities. Each of the wireless sensors 662-1, 662-2, 662-3, 662-4, 662-5, 662-6, 662-7, 662-8 scans airwaves to probe for information of respective one or more beaconing APs to generate a beacon report and to transmit the beacon report to the cloud server 102 (e.g., the SLA module 110 in the cloud server 102). For example, the wireless sensor 662-1 scans the wireless communications channel to probe for information of respective one or more beaconing APs and generates an updated beacon report 770-1, which is different from the original beacon report 670-1 and contains AP2, AP3 (corresponding to the wireless APs 360-2, 360-3), and transmits the updated beacon report 770-1 to the cloud server 102 (e.g., the SLA module 110 in the cloud server 102). The wireless sensor 662-2 scans the wireless communications channel to probe for information of respective one or more beaconing APs and generates an updated beacon report 770-2, which is identical to the original beacon report 670-2 and contains AP2, AP3, AP4 (corresponding to the wireless APs 360-2, 360-3, 360-4), and transmits the updated beacon report 770-2 to the cloud server 102 (e.g., the SLA module 110 in the cloud server 102). The wireless sensor 662-3 scans the wireless communications channel to probe for information of respective one or more beaconing APs and generates an updated beacon report 770-3, which is identical to the original beacon report 670-3 and contains AP4, AP5, AP6 (corresponding to the wireless APs 360-4, 360-5, 360-6), and transmits the updated beacon report 770-3 to the cloud server 102 (e.g., the SLA module 110 in the cloud server 102). The wireless sensor 662-4 scans the wireless communications channel to probe for information of respective one or more beaconing APs and generates an updated beacon report 770-4, which is identical to the original beacon report 670-4 and contains AP5, AP6 (corresponding to the wireless APs 360-5, 360-6), and transmits the updated beacon report 670-4 to the cloud server 102 (e.g., the SLA module 110 in the cloud server 102). The wireless sensor 662-5 scans the wireless communications channel to probe for information of respective one or more beaconing APs and generates an updated beacon report 770-5, which is identical to the original beacon report 670-5 and AP7, AP8, AP9 (corresponding to the wireless APs 360-7, 360-8, 360-9), and transmits the updated beacon report 770-5 to the cloud server 102 (e.g., the SLA module 110 in the cloud server 102). The wireless sensor 662-6 scans the wireless communications channel to probe for information of respective one or more beaconing APs and generates an updated beacon report 770-6, which is identical to the original beacon report 670-6 and AP8, AP9 (corresponding to the wireless APs 360-8, 360-9), and transmits the updated beacon report 670-6 to the cloud server 102 (e.g., the SLA module 110 in the cloud server 102). The wireless sensor 662-7 scans the wireless communications channel to probe for information of respective one or more beaconing APs and generates an updated beacon report 770-7, which is different from the original beacon report 670-7 and contains AP10, AP11, AP12 (corresponding to the wireless APs 360-10, 360-11, 360-12), and transmits the updated beacon report 770-7 to the cloud server 102 (e.g., the SLA module 110 in the cloud server 102). The wireless sensor 662-8 scans the wireless communications channel to probe for information of respective one or more beaconing APs and generates an updated beacon report 770-8, which is different from the original beacon report 670-8 and AP10, AP11, AP12 (corresponding to the wireless APs 360-10, 360-11, 360-12), and transmits the updated beacon report 770-8 to the cloud server 102 (e.g., the SLA module 110 in the cloud server 102). In some embodiments, the cloud server 102 (e.g., the SLA module 110 in the cloud server 102) analyzes the original beacon reports 670-1, 670-2, 670-3, 670-4, 670-5, 670-6, 670-7, 670-8 and the updated beacon reports 770-1, 770-2, 770-3, 770-4, 770-5, 770-6, 770-7, 770-8 from all of the wireless sensors 662-1, 662-2, 662-3, 662-4, 662-5, 662-6, 662-7, 662-8 on a particular floor to verify if the committed number of APs are heard on that floor. In these embodiments, if the committed capacity is not met at a particular time unit (e.g., a particular minute), the cloud server 102 (e.g., the SLA module 110 in the cloud server 102) considers that particular time unit to be in violation or lost.

Figure 8:
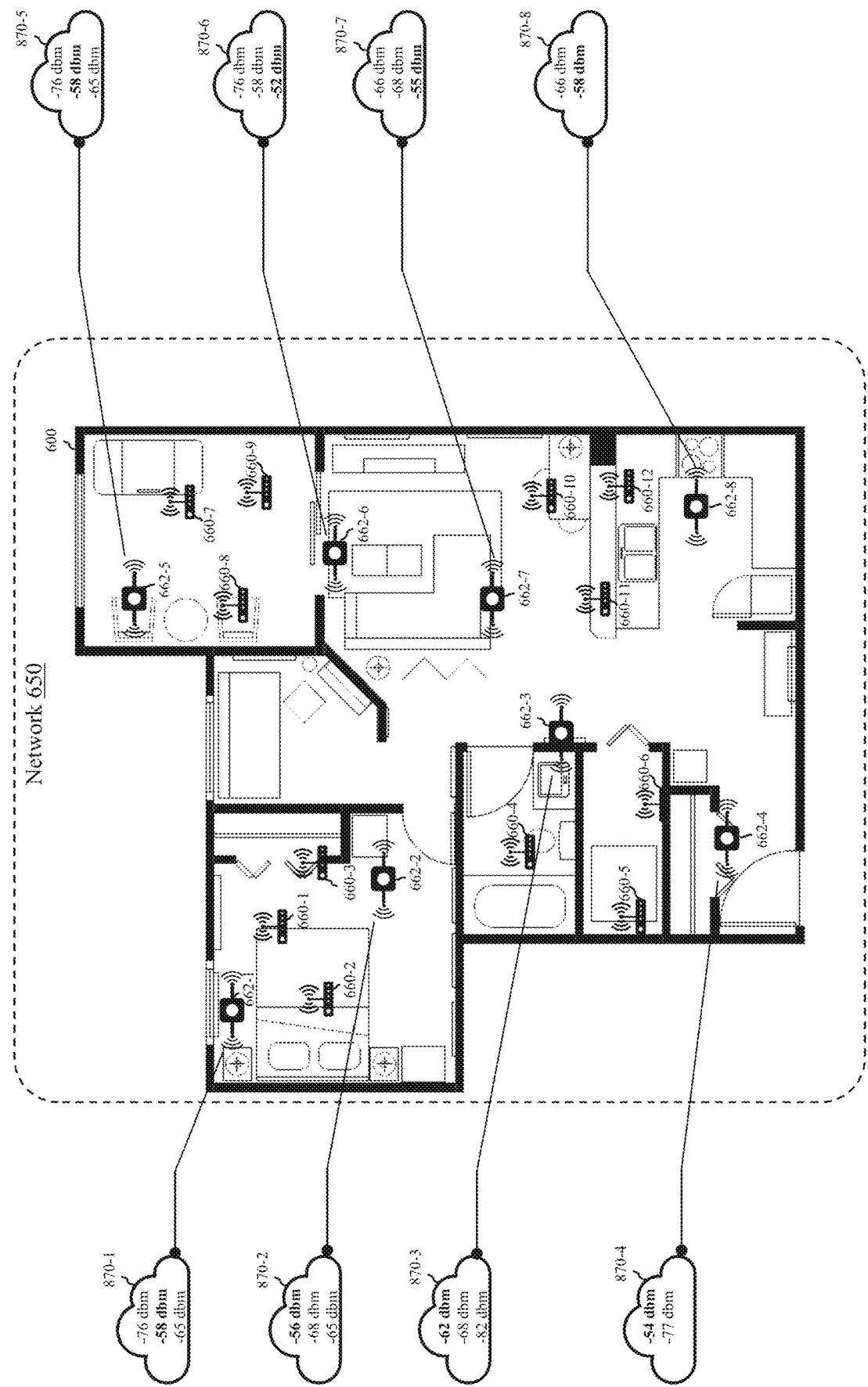
FIG. 8 depicts the network depicted in FIG. 6 with signal strength reports.

In some embodiments, the wireless sensors 662-1, 662-2, 662-3, 662-4, 662-5, 662-6, 662-7, 662-8 are configured to probe for network coverage information at the customer site 114. FIG. 8 depicts the network 650 depicted in FIG. 6 with signal strength reports 870-1, 870-2, 870-3, 870-4, 870-5, 870-6, 870-7, 870-8. In some embodiments, each of the wireless sensors 662-1, 662-2, 662-3, 662-4, 662-5, 662-6, 662-7, 662-8 scans airwaves to probe for information of respective one or more beaconing APs to generate a signal strength report and to transmit the signal strength report to the cloud server 102 (e.g., the SLA module 110 in the cloud server 102). In some embodiments, a site survey of the customer site 114 is performed, for example, by the cloud server 102 (e.g., the SLA module 110 in the cloud server 102), to identify access point and sensor locations. In some embodiments, the cloud server 102 (e.g., the SLA module 110 in the cloud server 102) analyzes data (e.g., signal strength reports) from all of the wireless sensors 662-1, 662-2, 662-3, 662-4, 662-5, 662-6, 662-7, 662-8 on a particular floor to verify if every wireless sensor can hear at least one AP with a committed signal strength. In these embodiments, if the committed signal strength is not met at a particular time unit (e.g., a particular minute), the cloud server 102 (e.g., the SLA module 110 in the cloud server 102) considers that the particular time unit to be in violation or lost. In some embodiments, if every wireless sensor in the network 650 can hear one or more wireless AP with committed signal strength, the cloud server 102 (e.g., the SLA module 110 in the cloud server 102) determines that the committed coverage is met or satisfied. If a wireless sensor does not hear any signal or the signal heard is below a predefined threshold, the cloud server 102 (e.g., the SLA module 110 in the cloud server 102) determines that the committed coverage is not met and that a coverage hole or gap is present. If a wireless sensor does not hear any signal or the signal heard is below a predefined threshold during a specific unit time, the cloud server 102 (e.g., the SLA module 110 in the cloud server 102) considers that specific time unit (e.g., minute) to be lost or in violation.

For example, the wireless sensor 662-1 scans the wireless communications channel to probe for information of respective one or more beaconing APs and generates a signal strength report 870-1, which contains signal strengths of −76 dbm, −58 dbm, and −65 dbm of wireless signals received from the wireless APs 360-1, 360-2, 360-3, and transmits the signal strength report 870-1 to the cloud server 102 (e.g., the SLA module 110 in the cloud server 102). Consequently, the highest signal strength of the signals received by the wireless sensor 662-1 is −58 dbm. The wireless sensor 662-2 scans the wireless communications channel to probe for information of respective one or more beaconing APs and generates a signal strength report 870-2, which contains signal strengths of −56 dbm, −68 dbm, and −65 dbm of wireless signals received from the wireless APs 360-2, 360-3, 360-4, and transmits the signal strength report 870-2 to the cloud server 102 (e.g., the SLA module 110 in the cloud server 102). Consequently, the highest signal strength of the signals received by the wireless sensor 662-2 is −56 dbm. The wireless sensor 662-3 scans the wireless communications channel to probe for information of respective one or more beaconing APs and generates a signal strength report 870-3, which contains signal strengths of −62 dbm, −68 dbm, and −82 dbm of wireless signals received from the wireless APs 360-4, 360-5, 360-6, and transmits the signal strength report 870-3 to the cloud server 102 (e.g., the SLA module 110 in the cloud server 102). Consequently, the highest signal strength of the signals received by the wireless sensor 662-3 is −62 dbm. The wireless sensor 662-4 scans the wireless communications channel to probe for information of respective one or more beaconing APs and generates a signal strength report 870-4, which contains signal strengths of −54 dbm and −77 dbm of wireless signals received from the wireless APs 360-5, 360-6, and transmits the signal strength report 870-4 to the cloud server 102 (e.g., the SLA module 110 in the cloud server 102). Consequently, the highest signal strength of the signals received by the wireless sensor 662-4 is −54 dbm. The wireless sensor 662-5 scans the wireless communications channel to probe for information of respective one or more beaconing APs and generates a signal strength report 870-5, which contains signal strengths of −76 dbm, −58 dbm, and −65 dbm of wireless signals received from the wireless APs 360-7, 360-8, 360-9, and transmits the signal strength report 870-5 to the cloud server 102 (e.g., the SLA module 110 in the cloud server 102). Consequently, the highest signal strength of the signals received by the wireless sensor 662-5 is −58 dbm. The wireless sensor 662-6 scans the wireless communications channel to probe for information of respective one or more beaconing APs and generates a signal strength report 870-6, which contains signal strengths of −76 dbm, −58 dbm, and −52 dbm of wireless signals received from the wireless APs 360-7, 360-8, 360-9, and transmits the signal strength report 870-6 to the cloud server 102 (e.g., the SLA module 110 in the cloud server 102). Consequently, the highest signal strength of the signals received by the wireless sensor 662-6 is −58 dbm. The wireless sensor 662-7 scans the wireless communications channel to probe for information of respective one or more beaconing APs and generates a signal strength report 870-7, which contains signal strengths of −66 dbm, −68 dbm, and −55 dbm of wireless signals received from the wireless APs 360-10, 360-11, 360-12, and transmits the signal strength report 870-7 to the cloud server 102 (e.g., the SLA module 110 in the cloud server 102). Consequently, the highest signal strength of the signals received by the wireless sensor 662-7 is −55 dbm. The wireless sensor 662-8 scans the wireless communications channel to probe for information of respective one or more beaconing APs and generates a signal strength report 870-8, which contains signal strengths of −66 dbm and −58 dbm of wireless signals received from the wireless APs 360-11, 360-12, and transmits the signal strength report 870-8 to the cloud server 102 (e.g., the SLA module 110 in the cloud server 102). Consequently, the highest signal strength of the signals received by the wireless sensor 662-8 is −58 dbm. When the signal strength threshold is set to a value such as −68 dbm, the signal strengths of the signals received by the wireless sensors 662-1, 662-2, 662-3, 662-4, 662-5, 662-6, 662-7, 662-8 are higher than the signal strength threshold and the committed signal strengths are met for all of the wireless sensors 662-1, 662-2, 662-3, 662-4, 662-5, 662-6, 662-7, 662-8.

In some embodiments, the cloud server 102 (e.g., the SLA module 110 in the cloud server 102) keeps track of all of the time units in violation and calculates the percentage of time in which the network coverage is met or satisfied using the following weighted average formula:

$$POTC = \frac{(\text{Total Time Units} - \text{Violation Time Units})}{\text{Total Time Units}}, \quad (5)$$

where POTC represents the percentage of time in which the network coverage is met or satisfied, Total Time Units represents the total time units for network coverage calculation, and Violation Time Units represents unit time in violation (i.e., the network coverage is not met). Although equation (5) is provided as an example, network coverage can be calculated in other ways, such as using other time-based functions or using lookup tables. The cloud server 102 (e.g., the SLA module 110 in the cloud server 102) can calculate the percentage of time in which the network coverage is met or satisfied in any suitable time unit, for example, in a minute, in a quarter hour, in an hour, and/or in a day. In some embodiments, the cloud server 102 (e.g., the SLA module 110 in the cloud server 102) is configured to calculate the percentage of time in which the network coverage is met or satisfied using the following weighted average formula:

$$POTC = \frac{(\text{Total Minutes} - \text{Violation Minutes})}{\text{Total Minutes}}, \quad (6)$$

where POTC represents the percentage of minutes in which the network coverage is met or satisfied, Total Minutes represents the total minutes for network coverage calculation, and Violation Minutes represents minutes in violation (i.e., the network coverage is not met). Although equation (6) is provided as an example, network coverage can be calculated in other ways. The cloud server 102 (e.g., the SLA module 110 in the cloud server 102) may be configured to calculate the percentage of minutes in which the network coverage is met or satisfied at a particular time interval, for example, every day, every week, or every month (e.g., at the end of the month). The cloud server 102 (e.g., the SLA module 110 in the cloud server 102) may compare a calculated network coverage with a committed network coverage to identify an SLA violation. In some embodiments, network coverage SLA is committed and calculated on a per building basis such that the cloud server 102 (e.g., the SLA module 110 in the cloud server 102) uses a weighted average of network coverage for all wireless sensors in a specific building to calculate network coverage of the specific building.

Figure 9:
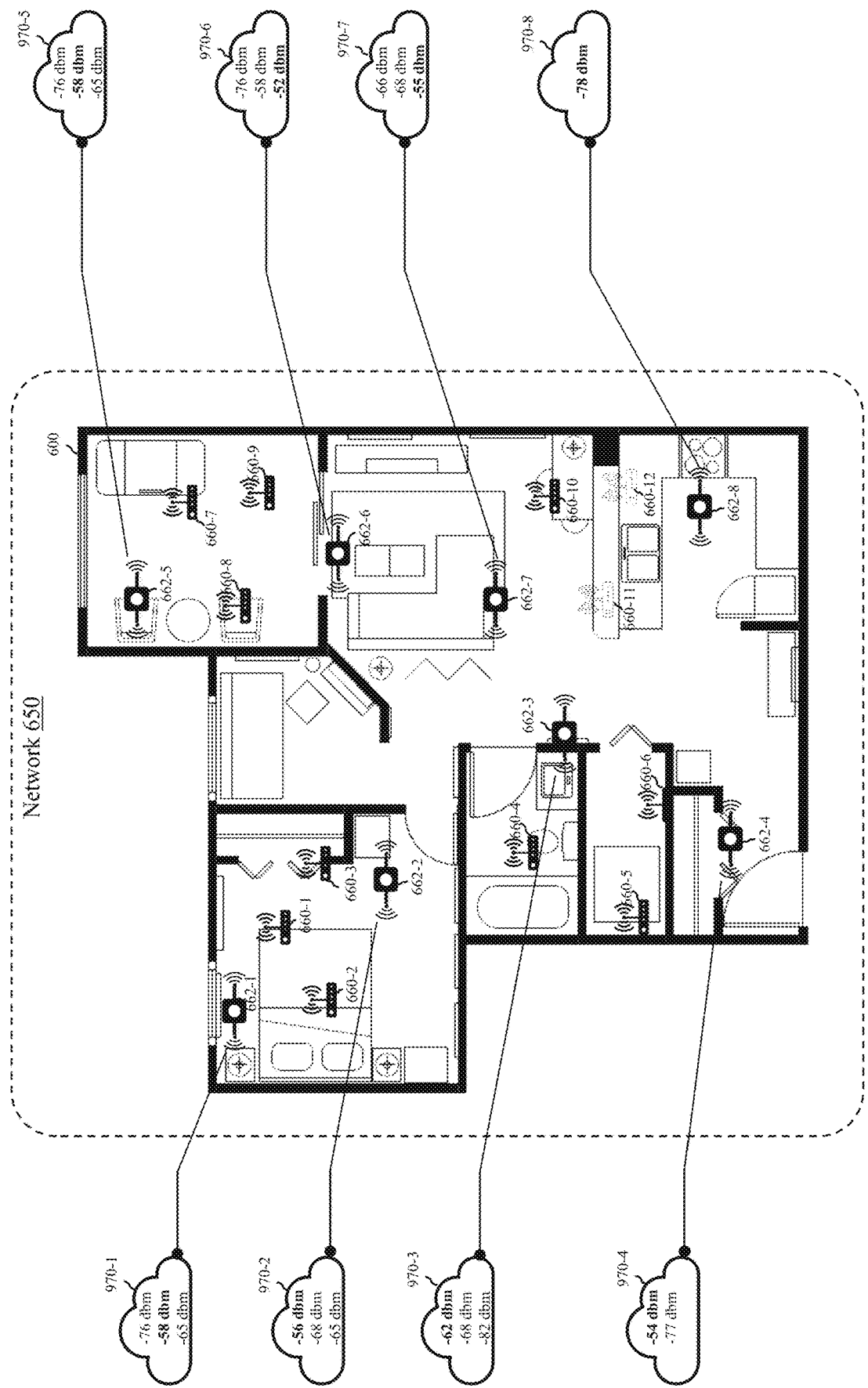
FIG. 9 depicts the network depicted in FIG. 6 with updated signal strength reports.

FIG. 9 depicts the network 650 depicted in FIG. 6 with updated signal strength reports 970-1, 970-2, 970-3, 970-4, 970-5, 970-6, 970-7, 970-8. In the embodiment depicted in FIG. 9, the wireless APs 660-1, 660-12 malfunction and lost wireless connection capacities. Each of the wireless sensors 662-1, 662-2, 662-3, 662-4, 662-5, 662-6, 662-7, 662-8 scans airwaves to probe for information of respective one or more beaconing APs to generate a signal strength report and to transmit the signal strength report to the cloud server 102 (e.g., the SLA module 110 in the cloud server 102). For example, the wireless sensor 662-1 scans the wireless communications channel to probe for information of respective one or more beaconing APs and generates a updated signal strength report 970-1, which is identical to the original signal strength report 870-1 and contains signal strengths of −76 dbm, −58 dbm, and −65 dbm of wireless signals received from the wireless APs 360-1, 360-2, 360-3, and transmits the updated signal strength report 970-1 to the cloud server 102 (e.g., the SLA module 110 in the cloud server 102). Consequently, the highest signal strength of the signals received by the wireless sensor 662-1 is −58 dbm. The wireless sensor 662-2 scans the wireless communications channel to probe for information of respective one or more beaconing APs and generates an updated signal strength report 970-2, which is identical to the original signal strength report 870-2 and contains signal strengths of −56 dbm, −68 dbm, and −65 dbm of wireless signals received from the wireless APs 360-2, 360-3, 360-4, and transmits the updated signal strength report 970-2 to the cloud server 102 (e.g., the SLA module 110 in the cloud server 102). Consequently, the highest signal strength of the signals received by the wireless sensor 662-2 is −56 dbm. The wireless sensor 662-3 scans the wireless communications channel to probe for information of respective one or more beaconing APs and generates an updated signal strength report 970-3, which is identical to the original signal strength report 870-3 and contains signal strengths of −62 dbm, −68 dbm, and −82 dbm of wireless signals received from the wireless APs 360-4, 360-5, 360-6, and transmits the updated signal strength report 970-3 to the cloud server 102 (e.g., the SLA module 110 in the cloud server 102). Consequently, the highest signal strength of the signals received by the wireless sensor 662-3 is −62 dbm. The wireless sensor 662-4 scans the wireless communications channel to probe for information of respective one or more beaconing APs and generates an updated signal strength report 970-4, which is identical to the original signal strength report 870-4 and contains signal strengths of −54 dbm and −77 dbm of wireless signals received from the wireless APs 360-5, 360-6, and transmits the updated signal strength report 970-4 to the cloud server 102 (e.g., the SLA module 110 in the cloud server 102). Consequently, the highest signal strength of the signals received by the wireless sensor 662-4 is −54 dbm. The wireless sensor 662-5 scans the wireless communications channel to probe for information of respective one or more beaconing APs and generates an updated signal strength report 970-5, which is identical to the original signal strength report 870-5 and contains signal strengths of −76 dbm, −58 dbm, and −65 dbm of wireless signals received from the wireless APs 360-7, 360-8, 360-9, and transmits the updated signal strength report 970-5 to the cloud server 102 (e.g., the SLA module 110 in the cloud server 102). Consequently, the highest signal strength of the signals received by the wireless sensor 662-5 is −58 dbm. The wireless sensor 662-6 scans the wireless communications channel to probe for information of respective one or more beaconing APs and generates an updated signal strength report 970-6, which is identical to the original signal strength report 870-6 and contains signal strengths of −76 dbm, −58 dbm, and −52 dbm of wireless signals received from the wireless APs 360-7, 360-8, 360-9, and transmits the updated signal strength report 970-6 to the cloud server 102 (e.g., the SLA module 110 in the cloud server 102). Consequently, the highest signal strength of the signals received by the wireless sensor 662-6 is −58 dbm. The wireless sensor 662-7 scans the wireless communications channel to probe for information of respective one or more beaconing APs and generates an updated signal strength report 970-7, which is identical to the original signal strength report 870-7 and contains signal strengths of −66 dbm, −68 dbm, and −55 dbm of wireless signals received from the wireless APs 360-10, 360-11, 360-12, and transmits the updated signal strength report 970-7 to the cloud server 102 (e.g., the SLA module 110 in the cloud server 102). Consequently, the highest signal strength of the signals received by the wireless sensor 662-7 is −55 dbm. The wireless sensor 662-8 scans the wireless communications channel to probe for information of respective one or more beaconing APs and generates an updated signal strength report 970-8, which is different from the original signal strength report 870-8 and contains a signal strength of −78 dbm of wireless signals received from the wireless AP 360-10, and transmits the updated signal strength report 970-8 to the cloud server 102 (e.g., the SLA module 110 in the cloud server 102). Consequently, the highest/only signal strength of the signals received by the wireless sensor 662-8 is −78 dbm. When the signal strength threshold is set to a value such as −68 dbm, the signal strengths of the signals received by the wireless sensors 662-1, 662-2, 662-3, 662-4, 662-5, 662-6, 662-7 are higher than the signal strength threshold and the committed signal strengths are met for the wireless sensors 662-1, 662-2, 662-3, 662-4, 662-5, 662-6, 662-7. When the signal strength threshold is set to a value such as −68 dbm, the signal strength of the signals received by the wireless sensor 662-8 is lower than the signal strength threshold and the committed signal strength is not met for the wireless sensor 662-8. In some embodiments, the cloud server 102 (e.g., the SLA module 110 in the cloud server 102) analyzes the original signal strength reports 870-1, 870-2, 870-3, 870-4, 870-5, 870-6, 870-7, 870-8 and the updated signal strength reports 870-1, 870-2, 870-3, 870-4, 870-5, 870-6, 870-7, 870-8 from all of the wireless sensors 662-1, 662-2, 662-3, 662-4, 662-5, 662-6, 662-7, 662-8 on a particular floor to verify if the committed network coverage is met or satisfied on that floor. In these embodiments, if the committed network coverage is not met at a particular time unit (e.g., a particular minute), the cloud server 102 (e.g., the SLA module 110 in the cloud server 102) considers that particular time unit to be in violation or lost.

In some embodiments, network SLA (e.g., a specific level of network availability, coverage and/or capacity) is committed per sensor. For example, network SLA is committed per each of the wireless sensors 662-1, 662-2, 662-3, 662-4, 662-5, 662-6, 662-7, 662-8. In some embodiments, network SLA is committed at a particular sensor location. For example, network SLA (e.g., a specific level of network availability, coverage and/or capacity) is committed at the location (e.g., the x-axis, y-axis coordinates) of each of the wireless sensors 662-1, 662-2, 662-3, 662-4, 662-5, 662-6, 662-7, 662-8. In an embodiment, if there are a particular number (e.g., 10) of sensors on a floor, network SLA is committed on a per-sensor basis only at those points (e.g., 10 points) on the floor plan.

Figure 10:
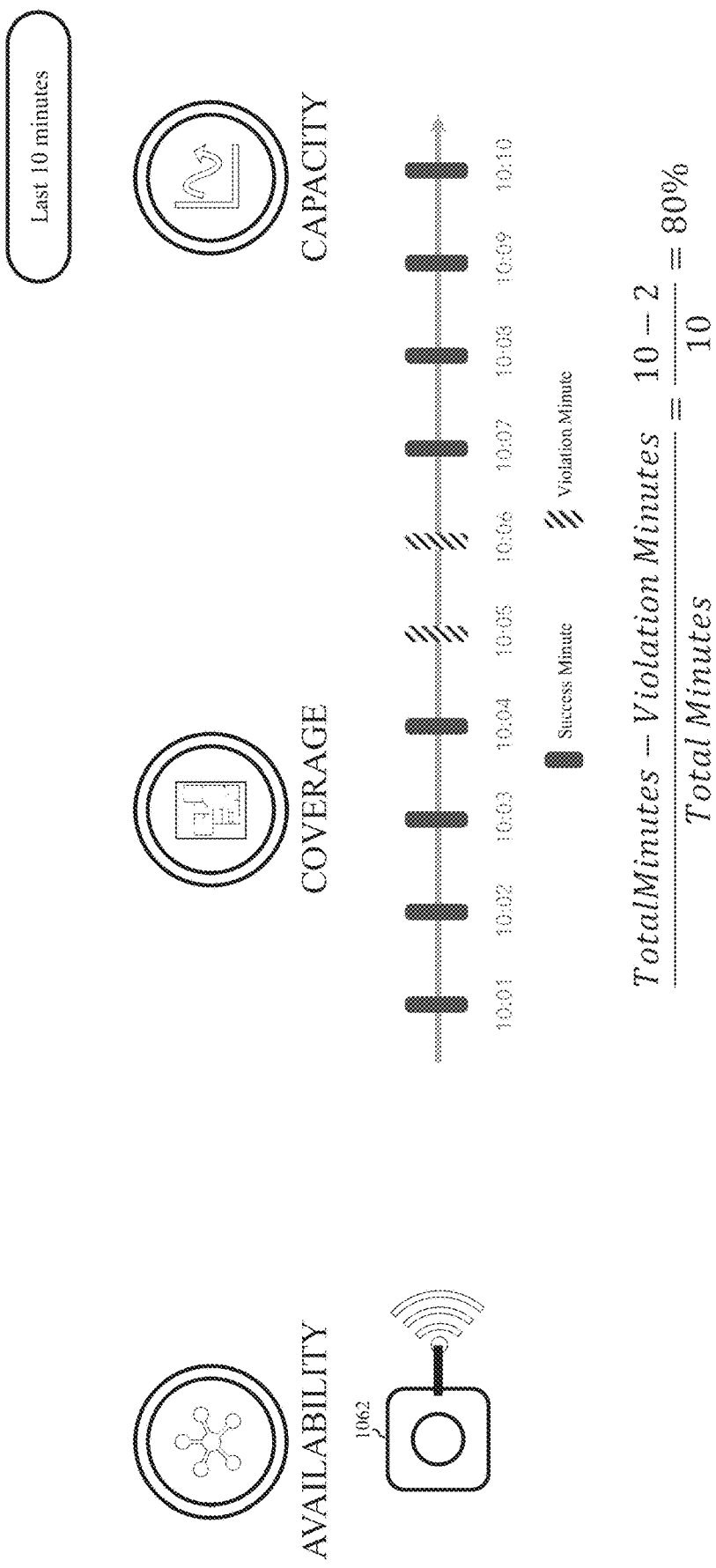
FIG. 10 illustrates an example of calculating an SLA percentage for a wireless sensor during a 10-minute span.

FIG. 10 illustrates an example of calculating an SLA percentage for a wireless sensor 1062 during a 10-minute span. The wireless sensor 1062 depicted in FIG. 10 may be similar to or the same as the wireless sensors 362-1, 362-2, 362-3 depicted in FIG. 3, the wireless sensor 462 depicted in FIG. 4, and/or the wireless sensors 662-1, 662-2, 662-3,

662-4, 662-5, 662-6, 662-7, 662-8 depicted in FIG. 6. In the example illustrated in FIG. 10, for the minutes between 10:01-10:10, the committed SLA (e.g., network availability, network coverage, and/or network capacity) is not met only at minutes 10:05, 10:06, and consequently, the SLA percentage is 80%, which means that the committed SLA is met or satisfied for 80% of time.

Figure 11:
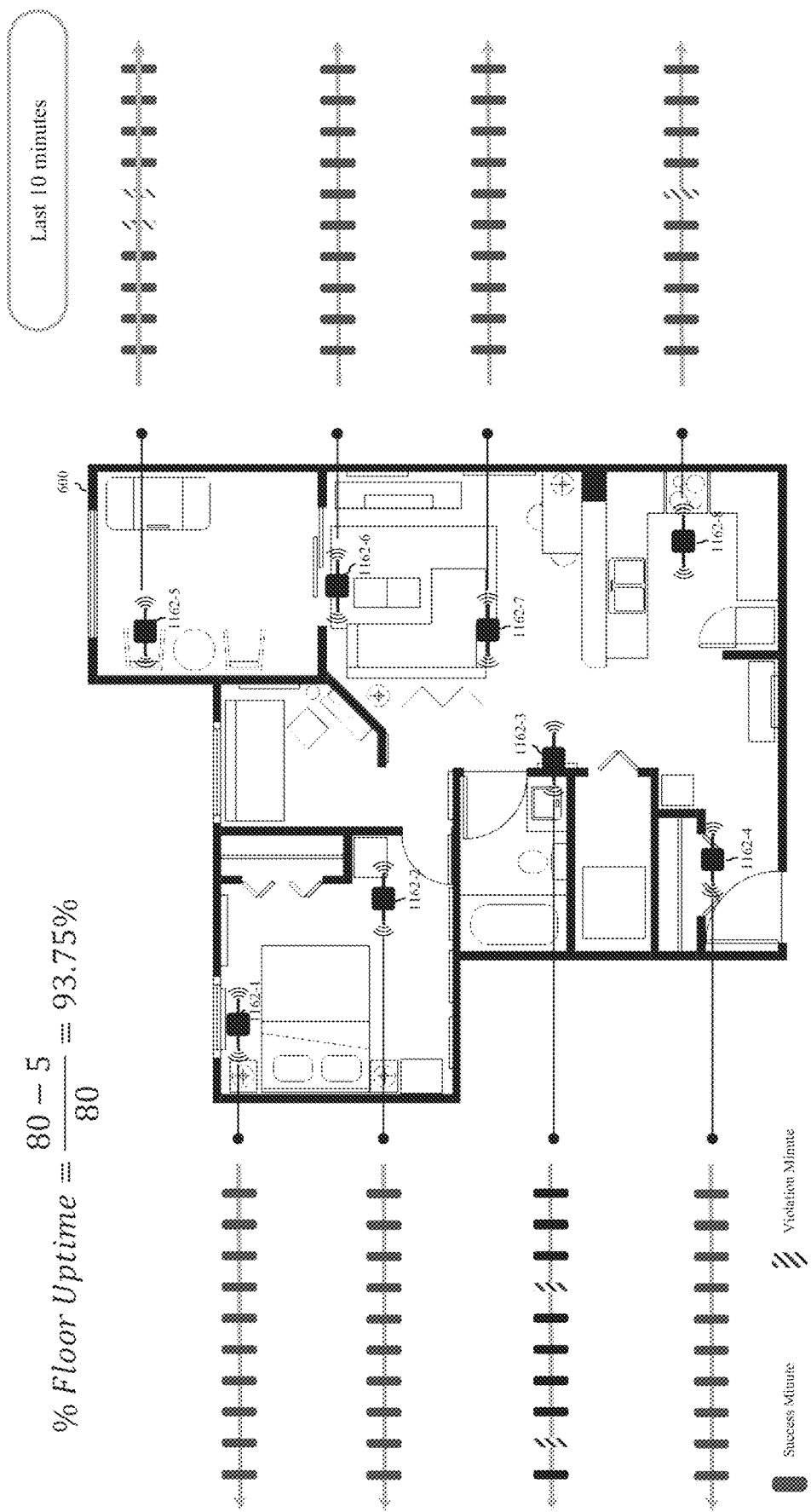
FIG. 11 illustrates an example of calculating an SLA percentage for wireless sensors in a floor plan during a 10-minute span.

FIG. 11 illustrates an example of calculating an SLA percentage for wireless sensors 1162-1, 1162-2, 1162-3, 1162-4, 1162-5, 1162-6, 1162-7, 1162-8 in a floor plan during a 10-minute span. The wireless sensors 1162-1, 1162-2, 1162-3, 1162-4, 1162-5, 1162-6, 1162-7, 1162-8 depicted in FIG. 11 may be similar to or the same as the wireless sensors 362-1, 362-2, 362-3 depicted in FIG. 3, the wireless sensor 462 depicted in FIG. 4, and/or the wireless sensors 662-1, 662-2, 662-3, 662-4, 662-5, 662-6, 662-7, 662-8 depicted in FIG. 6. In the example illustrated in FIG. 11, for the 10 minutes, the committed SLA (e.g., network availability, network coverage, and/or network capacity) is not met only at the second minute and the seventh minute for the wireless sensor 1162-3, at the fifth minute and the sixth minute for the wireless sensor 1162-5, and at the sixth minute for the wireless sensor 1162-8. Consequently, out of 80 working minutes for the wireless sensors 1162-1, 1162-2, 1162-3, 1162-4, 1162-5, 1162-6, 1162-7, 1162-8, 75 (i.e., 80-5) minutes are success minutes in which the committed SLA is met or satisfied, and the SLA percentage is 93.75%, which means that the committed SLA is met or satisfied for 93.75% of time on average.

Figure 12:
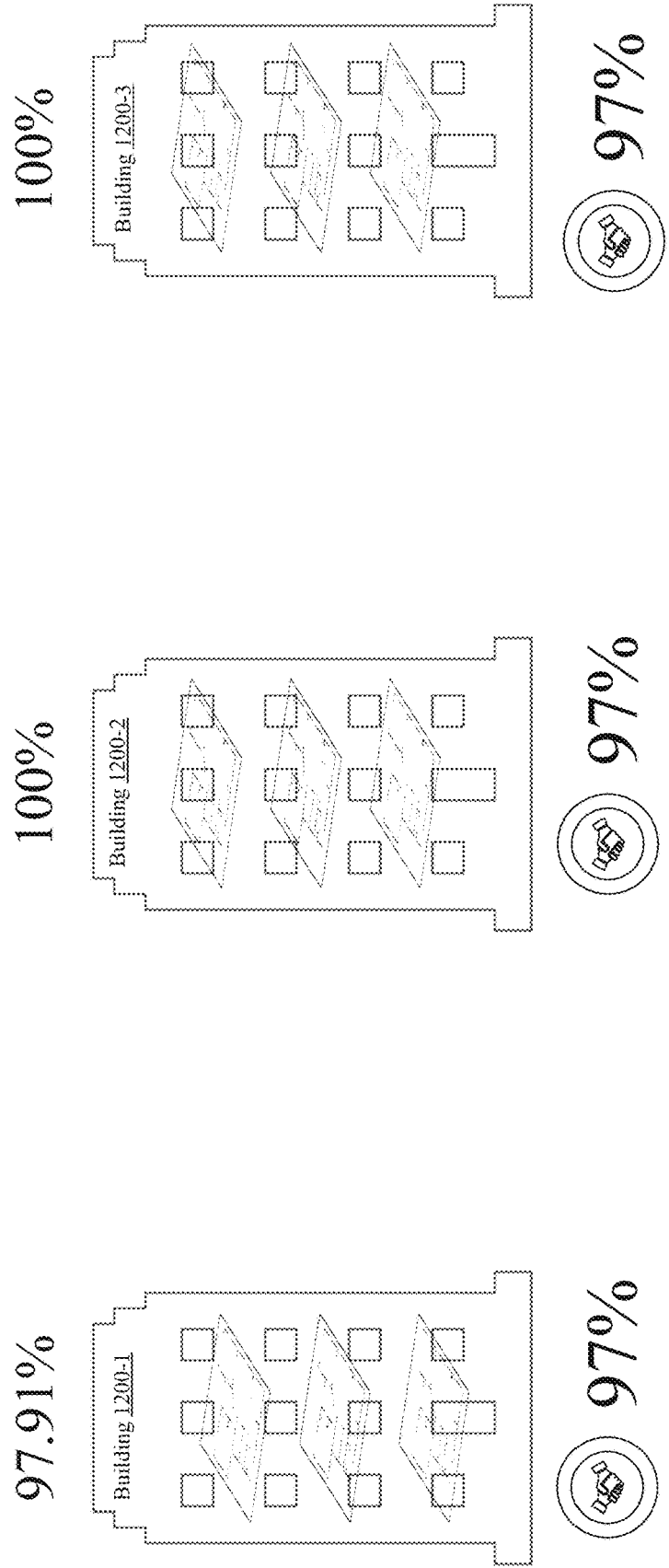
FIG. 12 illustrates some examples of building level SLA percentage calculated for buildings in a unit time.

FIG. 12 illustrates some examples of building level SLA percentage calculated for buildings 1200-1, 1200-2, 1200-3 in a unit time (e.g., in a 10-minute span). In the examples illustrated in FIG. 12, the building level SLA percentage calculated for building 1200-1 is 97.91%, the building level SLA percentage calculated for building 1200-2 is 100%, and the building level SLA percentage calculated for building 1200-3 is 100%. When the SLA threshold is set to a value such as 97%, the building level SLA percentages calculated for buildings 1200-1, 1200-2, 1200-3 are higher than the SLA threshold and the committed SLA are met for all of the buildings 1200-1, 1200-2, 1200-3.

Figure 13:
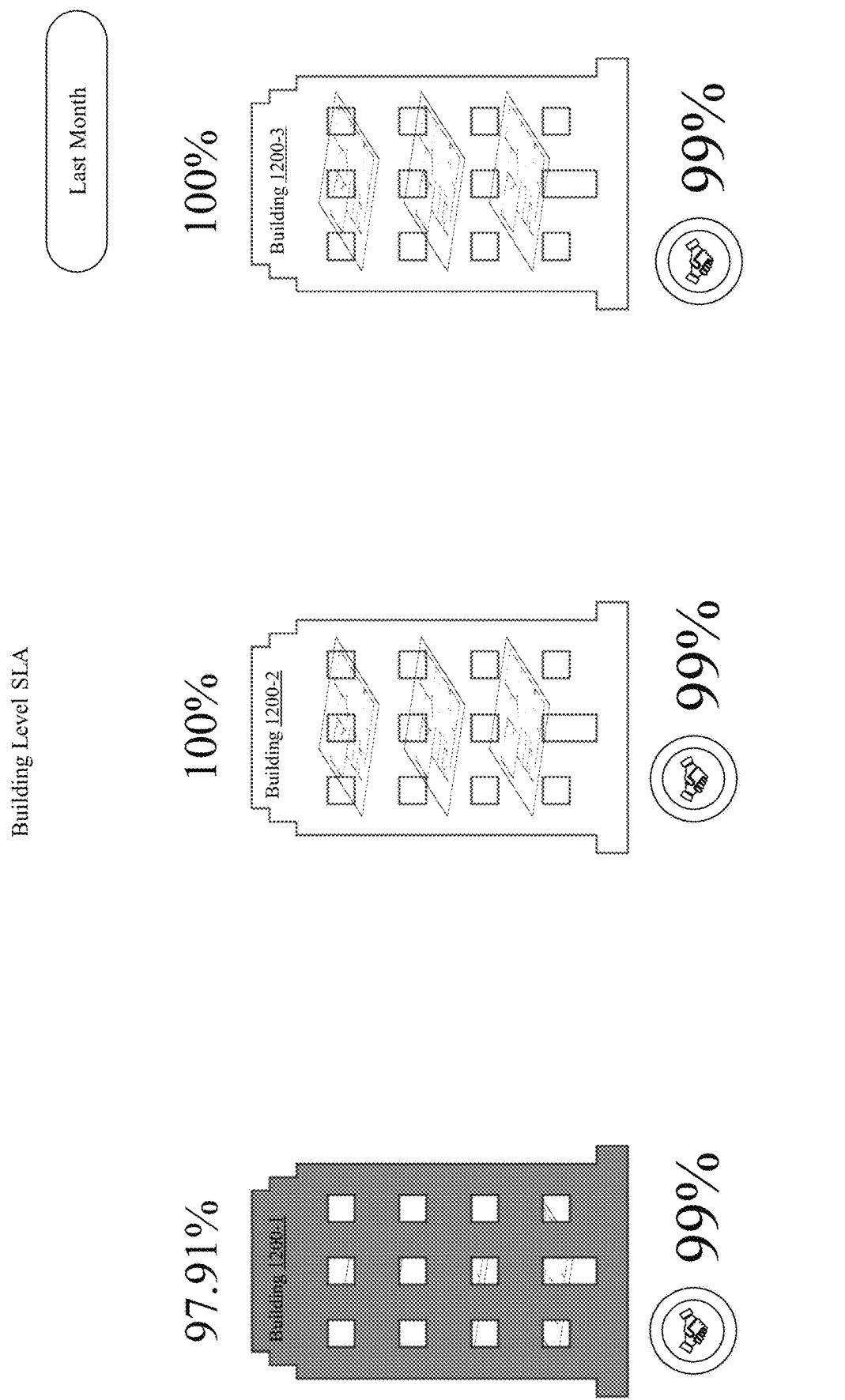
FIG. 13 illustrates some examples of building level SLA percentage calculated for buildings in a unit time.

FIG. 13 illustrates some examples of building level SLA percentage calculated for buildings 1300-1, 1300-2, 1300-3 in a unit time (e.g., in a 10-minute span or in a month). In the examples illustrated in FIG. 13, the building level SLA percentage calculated for building 1300-1 is 97.91%, the building level SLA percentage calculated for building 1300-2 is 100%, and the building level SLA percentage calculated for building 1300-3 is 100%. When the SLA threshold is set to a value such as 99%, the building level SLA percentages calculated for buildings 1300-2, 1300-3 are higher than the SLA threshold and the committed SLA are met for buildings 1300-2, 1300-3. However, because the building level SLA percentage calculated for building 1300-1 is lower than the SLA threshold and the committed SLA is not met for building 1300-1.

Figure 14:
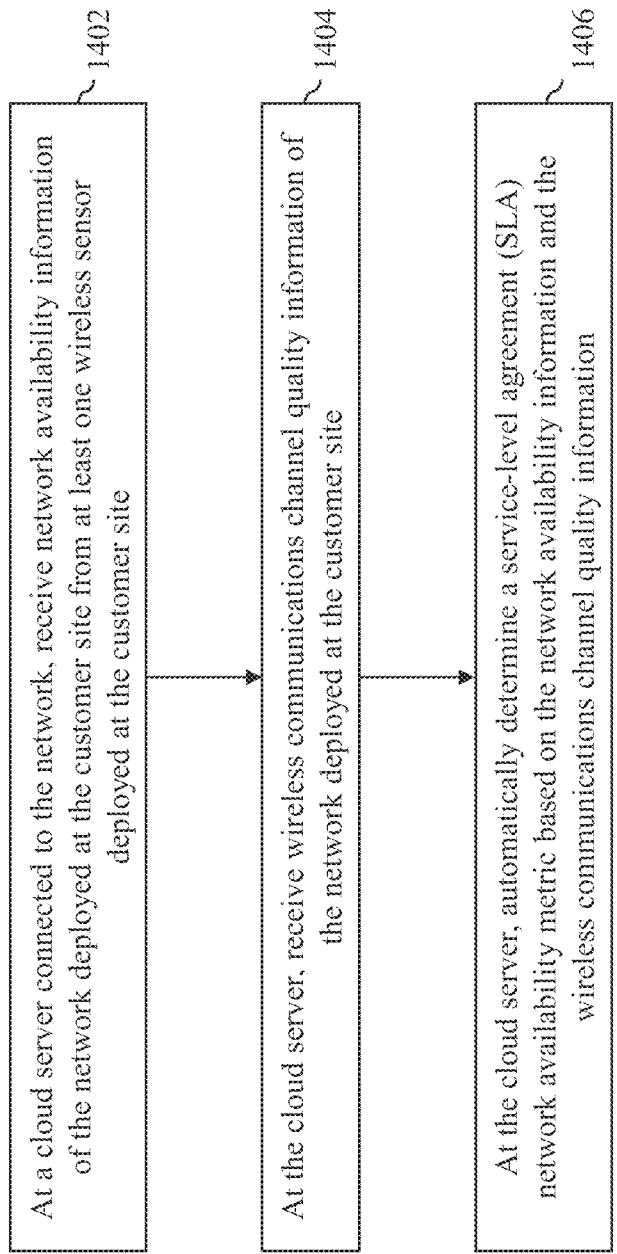
FIG. 14 is a process flow diagram of a method for network availability management of a network deployed at a customer site in accordance to an embodiment of the invention.

FIG. 14 is a process flow diagram of a method for network availability management of a network deployed at a customer site in accordance to an embodiment of the invention. According to the method, at block 1402, at a cloud server connected to the network, network availability information of the network deployed at the customer site is received from at least one wireless sensor deployed at the customer site. In some embodiments, the network availability information includes probing information between the at least one wireless sensor and the network deployed at the customer site. At block 1404, at the cloud server, wireless communications channel quality information of the network deployed at the customer site is received. In some embodiments, the wireless communications channel quality information includes noise floor information, interference information, and channel utilization information of a wireless communications channel between the at least one wireless sensor and at least one wireless access point (AP). At block 1406, at the cloud server, an SLA network availability metric is automatically determined based on the network availability information and the wireless communications channel quality information. In some embodiments, at the cloud server, a channel quality score is calculated based on the noise floor information, the interference information, and the channel utilization information of the wireless communications channel. In some embodiments, at the cloud server, the SLA network availability metric is kept when the channel quality score is below a channel quality threshold. In some embodiments, at the cloud server, the SLA network availability metric is automatically determined based on the network availability information and the wireless communications channel quality information for each floor at the customer site. In some embodiments, at the cloud server, the SLA network availability metric is automatically determined based on the network availability information and the wireless communications channel quality information for each building at the customer site. In some embodiments, at the cloud server, network coverage or capacity information of the network deployed at the customer site is received, and at the cloud server, an SLA network coverage or capacity metric is automatically determined based on the network coverage or capacity information. In some embodiments, at the cloud server, an alert is generated regarding the network deployed at the customer site when the SLA network availability metric does not satisfy a predetermined threshold. In some embodiments, the SLA network availability metric includes a percentage of time in which a predetermined network availability is satisfied in a time unit, and at the cloud server, the alert is generated regarding the network deployed at the customer site when the percentage of time in which the predetermined network availability is satisfied in the time unit is lower than the predetermined threshold. The cloud server may be similar to, the same as, or a component of the cloud server 102 depicted in FIG. 1. The at least one wireless sensor may be similar to, the same as, or a component of the wireless sensors 362-1, 362-2, 362-3 depicted in FIG. 3, the wireless sensor 462 depicted in FIG. 4, the wireless sensor 562 depicted in FIG. 5, the wireless sensors 662-1, 662-2, 662-3, 662-4, 662-5, 662-6, 662-7, 662-8 depicted in FIG. 6, the wireless sensor 1062 depicted in FIG. 6, and/or the wireless sensors 1162-1, 1162-2, 1162-3, 1162-4, 1162-5, 1162-6, 1162-7, 1162-8 depicted in FIG. 11. The customer site may be similar to, the same as, or a component of the customer site 114 depicted in FIG. 1. The at least one wireless AP may be similar to, the same as, or a component of the wireless APs 360-1, 360-2, 360-3, 360-4, 360-5, 360-6 depicted in FIG. 3, the wireless AP 560 depicted in FIG. 5, and/or the wireless APs 660-1, 660-2, 660-3, 660-4, 660-5, 660-6, 660-7, 660-8, 660-9, 660-10, 660-11, 660-12 depicted in FIG. 6.

Figure 15:
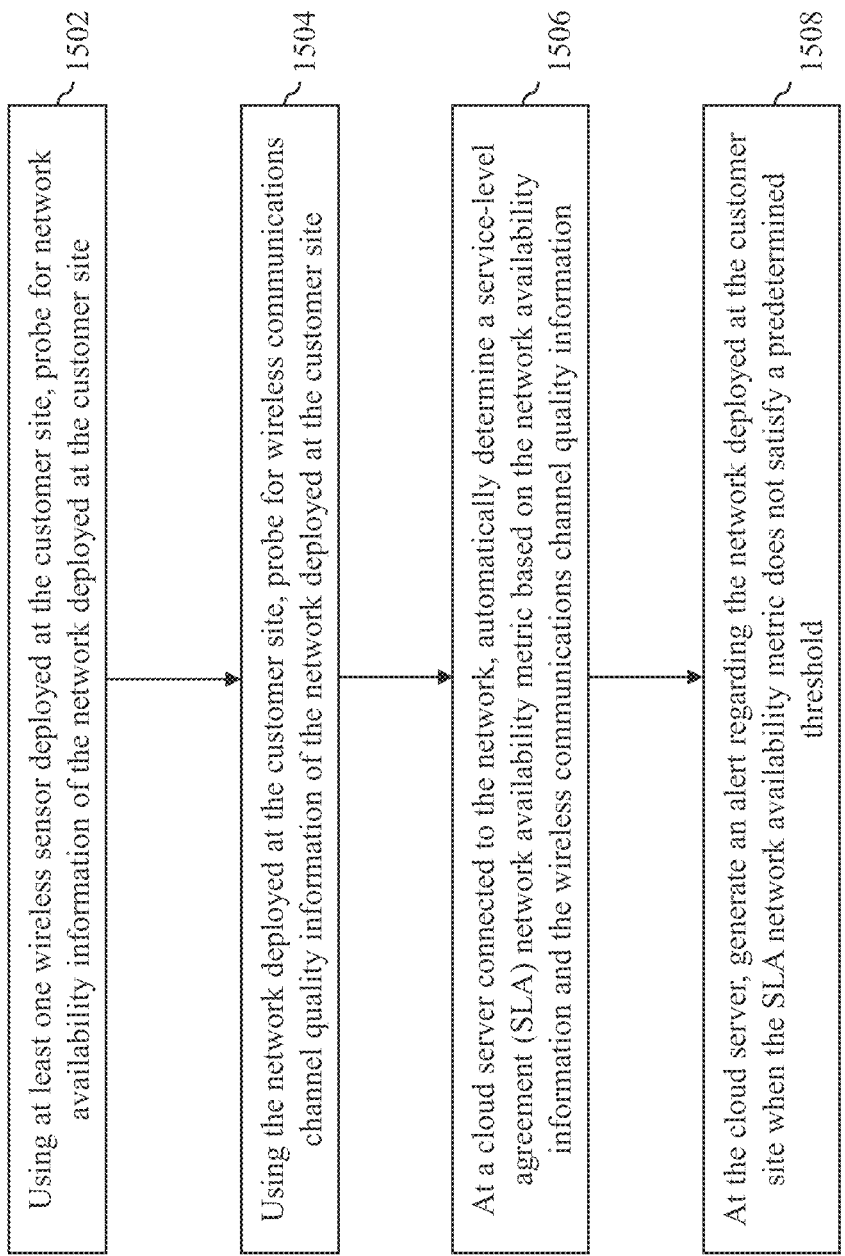
FIG. 15 is a process flow diagram of a method for network availability management of a network deployed at a customer site in accordance to another embodiment of the invention.

FIG. 15 is a process flow diagram of a method for network availability management of a network deployed at a customer site in accordance to another embodiment of the invention. According to the method, at block 1502, using at least one wireless sensor deployed at the customer site, network availability information of the network deployed at the customer site is probed for. At block 1504, using the network deployed at the customer site, wireless communications channel quality information of the network deployed at the customer site is probed for. At block 1506, at a cloud server connected to the network, a service-level agreement (SLA) network availability metric is automatically determined based on the network availability information and the wireless communications channel quality information. At block 1508, at the cloud server, an alert is generated regarding the network deployed at the customer site when the SLA network availability metric does not satisfy a predetermined threshold. The cloud server may be similar to, the same as, or a component of the cloud server 102 depicted in FIG. 1. The at least one wireless sensor may be similar to, the same as, or a component of the wireless sensors 362-1, 362-2, 362-3 depicted in FIG. 3, the wireless sensor 462 depicted in FIG. 4, the wireless sensor 562 depicted in FIG. 5, the wireless sensors 662-1, 662-2, 662-3, 662-4, 662-5, 662-6, 662-7, 662-8 depicted in FIG. 6, the wireless sensor 1062 depicted in FIG. 6, and/or the wireless sensors 1162-1, 1162-2, 1162-3, 1162-4, 1162-5, 1162-6, 1162-7, 1162-8 depicted in FIG. 11. The customer site may be similar to, the same as, or a component of the customer site 114 depicted in FIG. 1.

Figure 16:
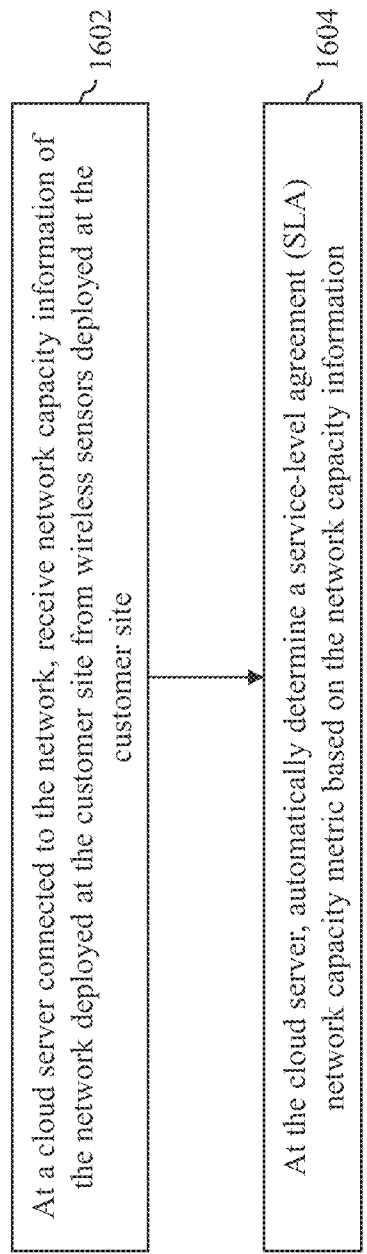
FIG. 16 is a process flow diagram of a method for network capacity management of a network deployed at a customer site in accordance to an embodiment of the invention.

FIG. 16 is a process flow diagram of a method for network capacity management of a network deployed at a customer site in accordance to an embodiment of the invention. According to the method, at block 1602, at a cloud server connected to the network, network capacity information of the network deployed at the customer site is received from wireless sensors deployed at the customer site. In some embodiments, the network capacity information includes information regarding wireless APs in the network deployed at the customer site whose beacon signals are received by the wireless sensors deployed at the customer site. In some embodiments, the information regarding the wireless APs in the network deployed at the customer site whose beacon signals are received by the wireless sensors deployed at the customer site includes beacon AP reports from the wireless sensors. In some embodiments, each of the beacon AP reports contains at least one wireless AP in the network deployed at the customer site whose beacon signal is received by a respective wireless sensor of the wireless sensors deployed at the customer site. In some embodiments, the network capacity information includes a quantity of wireless APs in the network deployed at the customer site whose beacon signals are received by the wireless sensors deployed at the customer site. At block 1604, at the cloud server, a service-level agreement (SLA) network capacity metric is automatically determined based on the network capacity information. In some embodiments, at the cloud server, the SLA network capacity metric is automatically determined based on the network capacity information for each floor at the customer site. In some embodiments, at the cloud server, the SLA network capacity metric is automatically determined based on the network capacity information for each building at the customer site. In some embodiments, at the cloud server, network availability or coverage information of the network deployed at the customer site is received, and at the cloud server, an SLA network coverage metric is automatically determined based on the network coverage information. In some embodiments, at the cloud server, an alert is generated regarding the network deployed at the customer site when the SLA network capacity metric does not satisfy a predetermined threshold. In some embodiments, the SLA network capacity metric includes a percentage of time in which a predetermined network capacity is satisfied in a time unit, and at the cloud server, the alert is generated regarding the network deployed at the customer site when the percentage of time in which the predetermined network capacity is satisfied in the time unit is lower than the predetermined threshold. The cloud server may be similar to, the same as, or a component of the cloud server 102 depicted in FIG. 1. The at least one wireless sensor may be similar to, the same as, or a component of the wireless sensors 362-1, 362-2, 362-3 depicted in FIG. 3, the wireless sensor 462 depicted in FIG. 4, the wireless sensor 562 depicted in FIG. 5, the wireless sensors 662-1, 662-2, 662-3, 662-4, 662-5, 662-6, 662-7, 662-8 depicted in FIG. 6, the wireless sensor 1062 depicted in FIG. 6, and/or the wireless sensors 1162-1, 1162-2, 1162-3, 1162-4, 1162-5, 1162-6, 1162-7, 1162-8 depicted in FIG. 11. The customer site may be similar to, the same as, or a component of the customer site 114 depicted in FIG. 1. The wireless APs may be similar to, the same as, or a component of the wireless APs 360-1, 360-2, 360-3, 360-4, 360-5, 360-6 depicted in FIG. 3, the wireless AP 560 depicted in FIG. 5, and/or the wireless APs 660-1, 660-2, 660-3, 660-4, 660-5, 660-6, 660-7, 660-8, 660-9, 660-10, 660-11, 660-12 depicted in FIG. 6.

Figure 17:
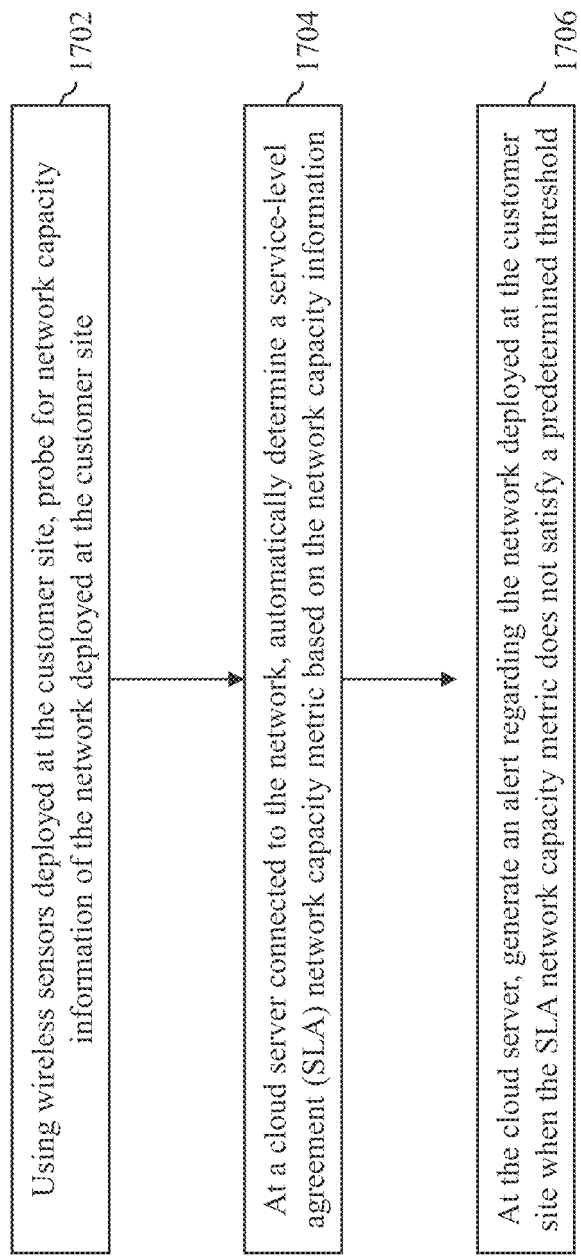
FIG. 17 is a process flow diagram of a method for network capacity management of a network deployed at a customer site in accordance to another embodiment of the invention.

FIG. 17 is a process flow diagram of a method for network capacity management of a network deployed at a customer site in accordance to another embodiment of the invention. According to the method, at block 1702, using wireless sensors deployed at the customer site, network capacity information of the network deployed at the customer site is probed for. At block 1704, at a cloud server connected to the network, an SLA network capacity metric is automatically determined based on the network capacity information. At block 1706, at the cloud server, an alert is generated regarding the network deployed at the customer site when the SLA network capacity metric does not satisfy a predetermined threshold. The cloud server may be similar to, the same as, or a component of the cloud server 102 depicted in FIG. 1. The at least one wireless sensor may be similar to, the same as, or a component of the wireless sensors 362-1, 362-2, 362-3 depicted in FIG. 3, the wireless sensor 462 depicted in FIG. 4, the wireless sensor 562 depicted in FIG. 5, the wireless sensors 662-1, 662-2, 662-3, 662-4, 662-5, 662-6, 662-7, 662-8 depicted in FIG. 6, the wireless sensor 1062 depicted in FIG. 6, and/or the wireless sensors 1162-1, 1162-2, 1162-3, 1162-4, 1162-5, 1162-6, 1162-7, 1162-8 depicted in FIG. 11. The customer site may be similar to, the same as, or a component of the customer site 114 depicted in FIG. 1.

Figure 18:
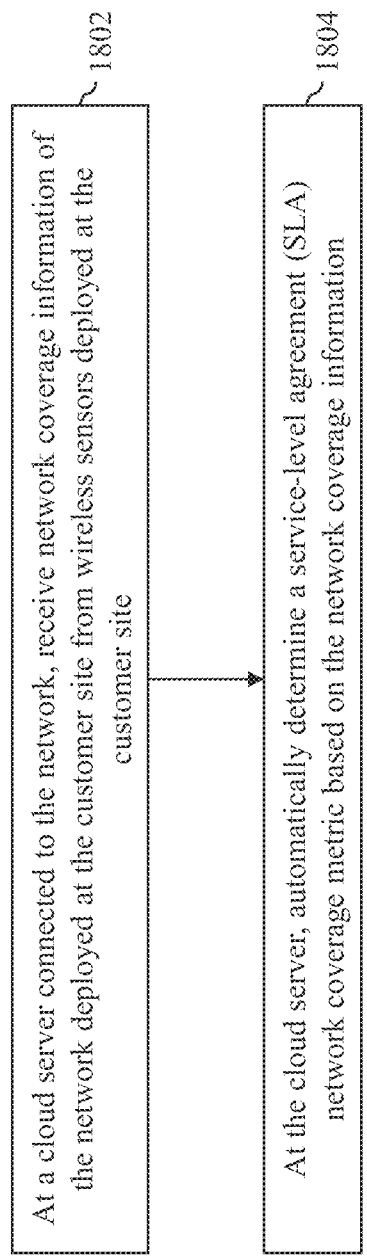
FIG. 18 is a process flow diagram of a method for network coverage management of a network deployed at a customer site in accordance to an embodiment of the invention.

FIG. 18 is a process flow diagram of a method for network coverage management of a network deployed at a customer site in accordance to an embodiment of the invention. According to the method, at block 1802, at a cloud server connected to the network, receiving network coverage information of the network deployed at the customer site from wireless sensors deployed at the customer site. In some embodiments, the network coverage information includes signal strength information regarding wireless APs in the network deployed at the customer site whose signals are received by the wireless sensors deployed at the customer site. In some embodiments, the information regarding the wireless APs in the network deployed at the customer site whose signals are received by the wireless sensors deployed at the customer site includes AP signal strength reports from the wireless sensors. In some embodiments, each of the AP signal strength reports contains signal strength information of at least one wireless AP in the network deployed at the customer site whose signal is received by a respective wireless sensor of the wireless sensors deployed at the customer site. In some embodiments, the network coverage information includes highest signal strength information of wireless APs in the network deployed at the customer site whose signals are received by the wireless sensors deployed at the customer site. At block 1804, at the cloud server, automatically determining an SLA network coverage metric based on the network coverage information. In some embodiments, at the cloud server, an alert is generated regarding the network deployed at the customer site when the SLA network coverage metric does not satisfy a predetermined threshold. In some embodiments, the SLA network coverage metric includes a percentage of time in which a predetermined network coverage is satisfied in a time unit, and at the cloud server, the alert is generated regarding the network deployed at the customer site when the percentage of time in which the predetermined network coverage is satisfied in the time unit is lower than the predetermined threshold. In some embodiments, at the cloud server, the SLA network coverage metric is automatically determined based on the network coverage information for each floor at the customer site. In some embodiments, at the cloud server, the SLA network coverage metric is automatically determined based on the network coverage information for each building at the customer site. In some embodiments, at the cloud server, network availability or coverage information of the network deployed at the customer site is received and at the cloud server, an SLA network availability or coverage is automatically determined based on the network coverage information. The cloud server may be similar to, the same as, or a component of the cloud server 102 depicted in FIG. 1. The at least one wireless sensor may be similar to, the same as, or a component of the wireless sensors 362-1, 362-2, 362-3 depicted in FIG. 3, the wireless sensor 462 depicted in FIG. 4, the wireless sensor 562 depicted in FIG. 5, the wireless sensors 662-1, 662-2, 662-3, 662-4, 662-5, 662-6, 662-7, 662-8 depicted in FIG. 6, the wireless sensor 1062 depicted in FIG. 6, and/or the wireless sensors 1162-1, 1162-2, 1162-3, 1162-4, 1162-5, 1162-6, 1162-7, 1162-8 depicted in FIG. 11. The customer site may be similar to, the same as, or a component of the customer site 114 depicted in FIG. 1. The wireless APs may be similar to, the same as, or a component of the wireless APs 360-1, 360-2, 360-3, 360-4, 360-5, 360-6 depicted in FIG. 3, the wireless AP 560 depicted in FIG. 5, and/or the wireless APs 660-1, 660-2, 660-3, 660-4, 660-5, 660-6, 660-7, 660-8, 660-9, 660-10, 660-11, 660-12 depicted in FIG. 6.

Figure 19:
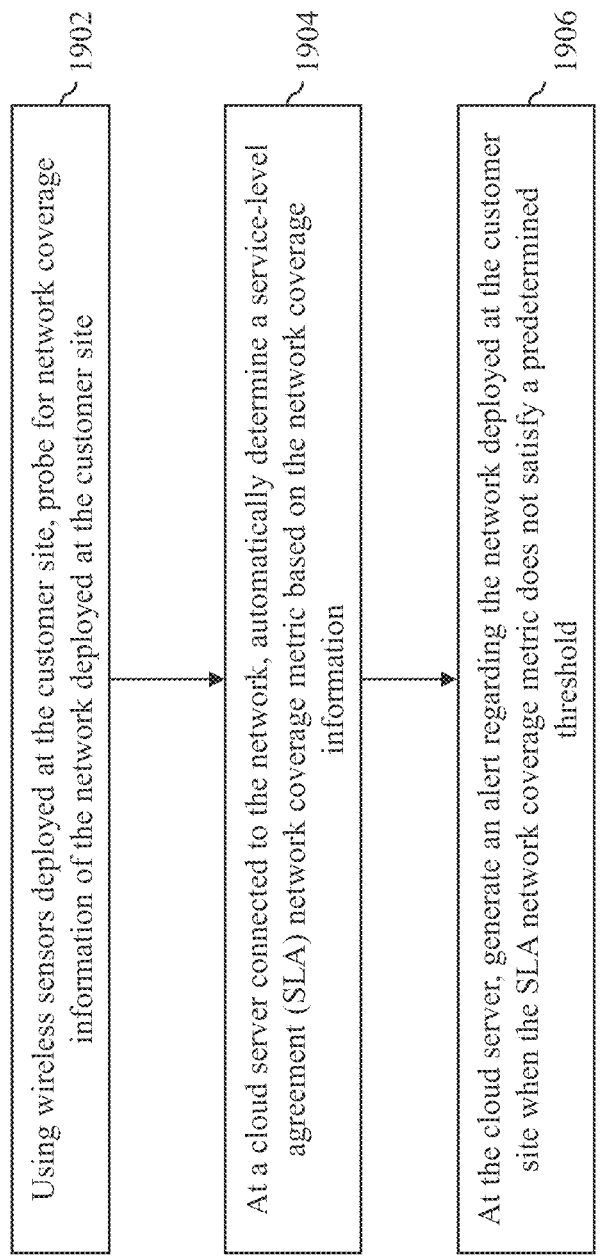
FIG. 19 is a process flow diagram of a method for network coverage management of a network deployed at a customer site in accordance to another embodiment of the invention.

FIG. 19 is a process flow diagram of a method for network coverage management of a network deployed at a customer site in accordance to another embodiment of the invention. According to the method, at block 1902, using wireless sensors deployed at the customer site, network coverage information of the network deployed at the customer site is probed for. At block 1904, at a cloud server connected to the network, a service-level agreement (SLA) network coverage metric is automatically determined based on the network coverage information. At block 1906, at the cloud server, an alert is generated regarding the network deployed at the customer site when the SLA network coverage metric does not satisfy a predetermined threshold. The cloud server may be similar to, the same as, or a component of the cloud server 102 depicted in FIG. 1. The at least one wireless sensor may be similar to, the same as, or a component of the wireless sensors 362-1, 362-2, 362-3 depicted in FIG. 3, the wireless sensor 462 depicted in FIG. 4, the wireless sensor 562 depicted in FIG. 5, the wireless sensors 662-1, 662-2, 662-3, 662-4, 662-5, 662-6, 662-7, 662-8 depicted in FIG. 6, the wireless sensor 1062 depicted in FIG. 6, and/or the wireless sensors 1162-1, 1162-2, 1162-3, 1162-4, 1162-5, 1162-6, 1162-7, 1162-8 depicted in FIG. 11. The customer site may be similar to, the same as, or a component of the customer site 114 depicted in FIG. 1.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for network capacity management of a network deployed at a customer site, the method comprising:
   at a cloud server connected to the network, receiving network capacity information of the network deployed at the customer site from a plurality of wireless sensors deployed at the customer site;
   at the cloud server, automatically determining a service-level agreement (SLA) network capacity metric based on the network capacity information; and
   at the cloud server, generating an alert regarding the network deployed at the customer site when the SLA network capacity metric does not satisfy a predetermined threshold;
   wherein the SLA network capacity metric comprises a percentage of time in which a predetermined network capacity is satisfied in a time unit, and wherein at the cloud server, generating the alert regarding the network deployed at the customer site when the SLA network capacity metric does not satisfy the predetermined threshold comprises at the cloud server, generating the alert regarding the network deployed at the customer site when the percentage of time in which the predetermined network capacity is satisfied in the time unit is lower than the predetermined threshold.

2. The method of claim 1, wherein the network capacity information comprises information regarding a plurality of wireless access points (APs) in the network deployed at the customer site whose beacon signals are received by the wireless sensors deployed at the customer site.

3. The method of claim 2, wherein the information regarding the wireless APs in the network deployed at the customer site whose beacon signals are received by the wireless sensors deployed at the customer site comprises a plurality of beacon AP reports from the wireless sensors.

4. The method of claim 3, wherein each of the beacon AP reports contains at least one wireless AP in the network deployed at the customer site whose beacon signal is received by a respective wireless sensor of the wireless sensors deployed at the customer site.

5. The method of claim 1, wherein the network capacity information comprises a quantity of wireless access points (APs) in the network deployed at the customer site whose beacon signals are received by the wireless sensors deployed at the customer site.

6. The method of claim 1, wherein at the cloud server, automatically determining the SLA network capacity metric based on the network capacity information comprises at the cloud server, automatically determining the SLA network capacity metric based on the network capacity information for each floor at the customer site.

7. The method of claim 1, wherein at the cloud server, automatically determining the SLA network capacity metric based on the network capacity information comprises at the cloud server, automatically determining the SLA network capacity metric based on the network capacity information for each building at the customer site.

8. The method of claim 1, further comprising:
at the cloud server, receiving network availability or coverage information of the network deployed at the customer site; and
at the cloud server, automatically determining an SLA network availability or coverage metric based on the network availability or coverage information.

9. A cloud server for network capacity management of a network deployed at a customer site, the cloud server comprising:
memory; and
one or more processors configured to:
receive network capacity information of the network deployed at the customer site from a plurality of wireless sensors deployed at the customer site;
automatically determine a service-level agreement (SLA) network capacity metric based on the network capacity information; and
generate an alert regarding the network deployed at the customer site when the SLA network capacity metric does not satisfy a predetermined threshold;
wherein the SLA network capacity metric comprises a percentage of time in which a predetermined network capacity is satisfied in a time unit, and wherein the one or more processors are further configured to generate the alert regarding the network deployed at the customer site when the percentage of time in which the predetermined network capacity is satisfied in the time unit is lower than the predetermined threshold.

10. The cloud server of claim 9, wherein the network capacity information comprises information regarding a plurality of wireless access points (APs) in the network deployed at the customer site whose beacon signals are received by the wireless sensors deployed at the customer site.

11. The cloud server of claim 10, wherein the information regarding the wireless APs in the network deployed at the customer site whose beacon signals are received by the wireless sensors deployed at the customer site comprises a plurality of beacon AP reports from the wireless sensors.

12. The cloud server of claim 11, wherein each of the beacon AP reports contains at least one wireless AP in the network deployed at the customer site whose beacon signal is received by a respective wireless sensor of the wireless sensors deployed at the customer site.

13. The cloud server of claim 9, wherein the network capacity information comprises a quantity of wireless access points (APs) in the network deployed at the customer site whose beacon signals are received by the wireless sensors deployed at the customer site.

14. The cloud server of claim 9, wherein the one or more processors are further configured to automatically determine the SLA network capacity metric based on the network capacity information for each floor at the customer site.

15. The cloud server of claim 9, wherein the one or more processors are further configured to automatically determine the SLA network capacity metric based on the network capacity information for each building at the customer site.

16. A method for network capacity management of a network deployed at a customer site, the method comprising:
using a plurality of wireless sensors deployed at the customer site, gathering network capacity information of the network deployed at the customer site;
at a cloud server connected to the network, automatically determining a service-level agreement (SLA) network capacity metric based on the network capacity information; and
at the cloud server, generating an alert regarding the network deployed at the customer site when the SLA network capacity metric does not satisfy a predetermined threshold;
wherein the SLA network capacity metric comprises a percentage of time in which a predetermined network capacity is satisfied in a time unit, and wherein at the cloud server, generating the alert regarding the network deployed at the customer site when the SLA network capacity metric does not satisfy the predetermined threshold comprises at the cloud server, generating the alert regarding the network deployed at the customer site when the percentage of time in which the predetermined network capacity is satisfied in the time unit is lower than the predetermined threshold.

* * * * *